US012712668B2

(12) United States Patent
Hu et al.

(10) Patent No.: US 12,712,668 B2
(45) Date of Patent: Aug. 18, 2026

(54) PERFORMANCE ENHANCEMENT OF RU DUPLICATION WITH PREDEFINED INTERLEAVING PATTERNS IN WIRELESS COMMUNICATIONS

(71) Applicant: MediaTek Inc., Hsinchu City (TW)

(72) Inventors: Shengquan Hu, San Jose, CA (US); Jianhan Liu, San Jose, CA (US); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 320 days.

(21) Appl. No.: 18/369,068

(22) Filed: Sep. 15, 2023

(65) Prior Publication Data

US 2024/0097820 A1 Mar. 21, 2024

Related U.S. Application Data

(60) Provisional application No. 63/376,123, filed on Sep. 19, 2022.

(51) Int. Cl.
*H04L 5/00* (2006.01)
*H04L 1/00* (2006.01)
(Continued)

(52) U.S. Cl.
CPC .................................. *H04L 1/0071* (2013.01)

(58) Field of Classification Search
CPC ... H04L 5/0053; H04L 1/0071; H04L 5/0007; H04L 5/0023; H04L 1/08; H04L 5/0094; H04L 27/26132; H04L 27/2085; H04W 84/12; H04W 72/0453; H04W 72/1263; H04W 72/04; H04W 72/1273; H04W 72/23; H04W 72/231; H04W 72/232; H04B 7/0452
(Continued)

(56) References Cited

U.S. PATENT DOCUMENTS 9,246,635 B2 * 1/2016 Baek .................. H04L 27/2627
10,484,852 B2 * 11/2019 Hwang .................. H04L 27/26
(Continued)

FOREIGN PATENT DOCUMENTS

WO WO 2022005193 A1 1/2022

OTHER PUBLICATIONS

European Patent Office, Extended European Search Report in European Patent Application No. 22198029.3-1213, Mar. 12, 2024.

*Primary Examiner* — Edan Orgad
*Assistant Examiner* — Vanneilian Lalchinthang
(74) *Attorney, Agent, or Firm* — Andy M. Han; Han IP PLLC

(57) ABSTRACT

Techniques pertaining to performance enhancement of resource unit (RU) duplication with predefined interleaving patterns in wireless communications are described. An apparatus (e.g., station (STA)) generates at least one RU. The apparatus then performs a wireless communication with RU duplication in a frequency domain using either: (a) a same interleaving pattern applied across orthogonal frequency-division multiplexing (OFDM) symbols of each duplicated RU of the at least one RU; or (b) two or more interleaving patterns periodically or alternatively switched over OFDM symbols of two or more duplicated RUs of the at least one RU.

14 Claims, 31 Drawing Sheets

GENERATE, BY A PROCESSOR OF AN APPARATUS, AT LEAST ONE RESOURCE UNIT (RU)

3110

PERFORM, BY THE PROCESSOR, A WIRELESS COMMUNICATION WITH RU DUPLICATION IN A FREQUENCY DOMAIN USING EITHER: (A) A SAME INTERLEAVING PATTERN APPLIED ACROSS ORTHOGONAL FREQUENCY-DIVISION MULTIPLEXING (OFDM) SYMBOLS OF EACH DUPLICATED RU OF THE AT LEAST ONE RU; OR (B) TWO OR MORE INTERLEAVING PATTERNS PERIODICALLY OR ALTERNATIVELY SWITCHED OVER OFDM SYMBOLS OF TWO OR MORE DUPLICATED RUs OF THE AT LEAST ONE RU

3120

(51) Int. Cl.
*H04L 27/26* (2006.01)
*H04W 72/04* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 10,805,933 | B2 * | 10/2020 | Stephens | H04W 4/90 |
| 11,382,124 | B2 * | 7/2022 | Moon | H04L 1/0013 |
| 11,387,937 | B2 * | 7/2022 | Xin | H04L 1/0057 |
| 2017/0230138 | A1 * | 8/2017 | Xiong | H04W 72/23 |
| 2021/0288768 | A1 * | 9/2021 | Yang | H04L 5/0044 |
| 2021/0391961 | A1 * | 12/2021 | Cao | H04L 1/08 |
| 2022/0038250 | A1 * | 2/2022 | Hu | H04W 72/0453 |
| 2023/0231670 | A1 * | 7/2023 | Park | H04L 27/26132 370/338 |
| 2024/0015059 | A1 * | 1/2024 | Balakrishnan | H04L 27/2085 |
| 2025/0141625 | A1 * | 5/2025 | Verenzuela | H04L 5/0051 |

* cited by examiner

100

500

(A)

STA1 STA1 STA2 STA2 STA1 STA1 STA2 STA2

(B)

STA1 STA2 STA2 STA1 STA2 STA2

(C)

STA1 STA2 STA3 STA1 STA2 STA3

Figure 31:
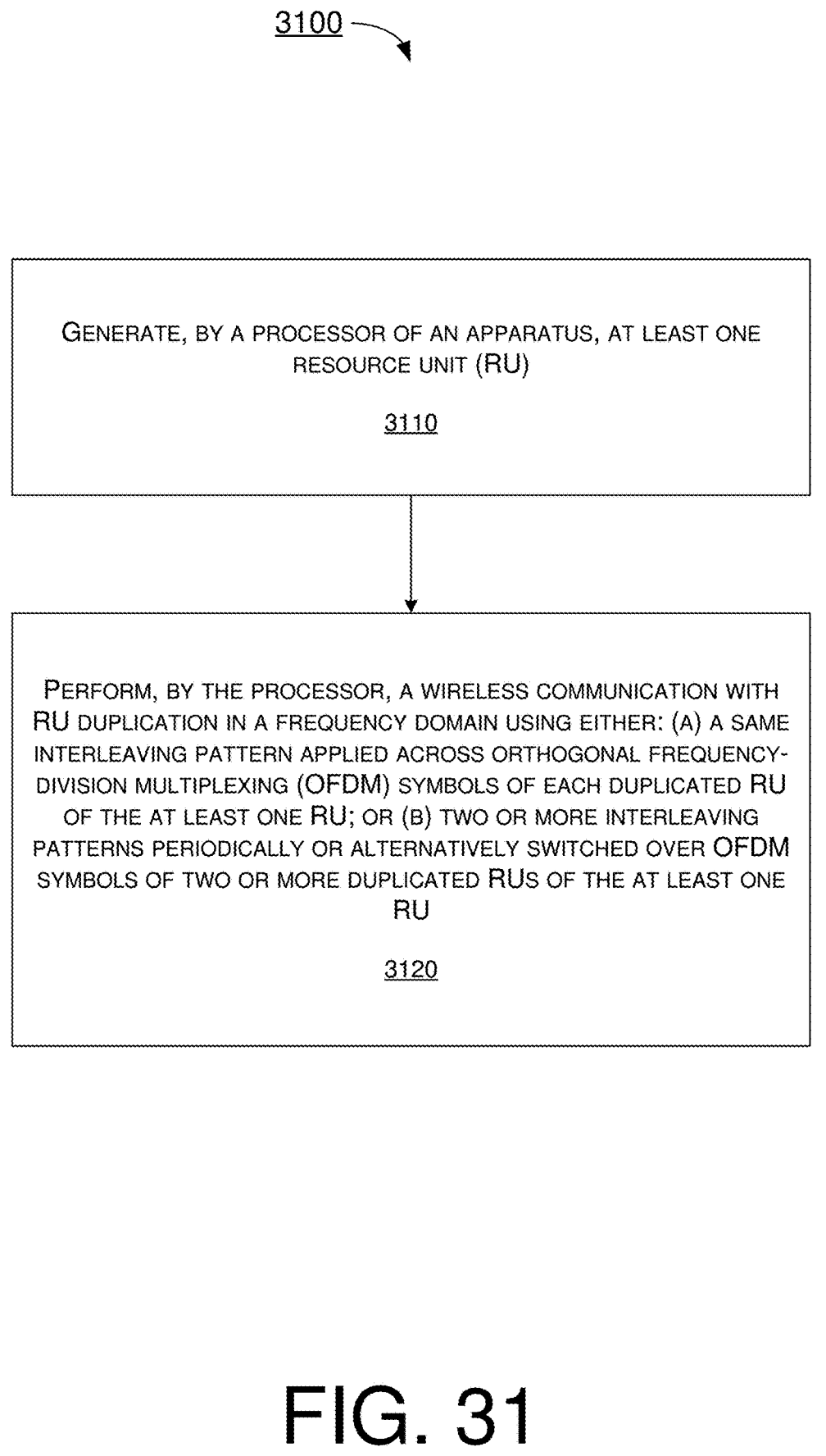

GENERATE, BY A PROCESSOR OF AN APPARATUS, AT LEAST ONE RESOURCE UNIT (RU)

3110

PERFORM, BY THE PROCESSOR, A WIRELESS COMMUNICATION WITH RU DUPLICATION IN A FREQUENCY DOMAIN USING EITHER: (A) A SAME INTERLEAVING PATTERN APPLIED ACROSS ORTHOGONAL FREQUENCY-DIVISION MULTIPLEXING (OFDM) SYMBOLS OF EACH DUPLICATED RU OF THE AT LEAST ONE RU; OR (B) TWO OR MORE INTERLEAVING PATTERNS PERIODICALLY OR ALTERNATIVELY SWITCHED OVER OFDM SYMBOLS OF TWO OR MORE DUPLICATED RUS OF THE AT LEAST ONE RU

PERFORMANCE ENHANCEMENT OF RU DUPLICATION WITH PREDEFINED INTERLEAVING PATTERNS IN WIRELESS COMMUNICATIONS

CROSS REFERENCE TO RELATED PATENT APPLICATION

The present disclosure is part of a non-provisional patent application claiming the priority benefit of U.S. Provisional Patent Application Nos. 63/376,123, filed 19 Sep. 2022, the content of which herein being incorporated by reference in its entirety.

TECHNICAL FIELD

The present disclosure is generally related to wireless communications and, more particularly, to performance enhancement of resource unit (RU) duplication with predefined interleaving patterns in wireless communications.

BACKGROUND

Unless otherwise indicated herein, approaches described in this section are not prior art to the claims listed below and are not admitted as prior art by inclusion in this section.

In wireless communications such as Wi-Fi (or WiFi) in accordance with the Institute of Electrical and Electronics Engineers (IEEE) 802.11 standards, RU duplication is proposed to extend the coverage range for wireless local area network (WLAN) connectivity. With ever-increasing deployment of Wi-Fi devices in next-generation WLANs, it is imperative that diversity gain be achieved for further performance enhancement. Therefore, there is a need for a solution of performance enhancement of RU duplication with predefined interleaving patterns in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to performance enhancement of RU duplication with predefined interleaving patterns in wireless communications. Under various proposed schemes in accordance with the present disclosure, packet error rate (PER) performance simulation results show that the gain of RU duplications with predefined interleaving patterns may be up to 1.5 dB. The interleaving patterns of RU duplication in the frequency domain may be predefined with some options. In a first option, the same interleaving patterns may be kept with no change across orthogonal frequency-division multiplexing (OFDM) symbols. In a second option, interleaving patterns may be periodically or alternatively switched over OFDM symbols.

In one aspect, a method may involve generating at least one RU. The method may also involve performing a wireless communication with RU duplication in a frequency domain using either: (a) a same interleaving pattern applied across OFDM symbols of each duplicated RU of the at least one RU; or (b) two or more interleaving patterns periodically or alternatively switched over OFDM symbols of two or more duplicated RUs of the at least one RU.

In another aspect, an apparatus may include a transceiver configured to communicate wirelessly and a processor coupled to the transceiver. The processor may generate at least one RU. The processor may also perform a wireless communication with RU duplication in a frequency domain using either: (a) a same interleaving pattern applied across OFDM symbols of each duplicated RU of the at least one RU; or (b) two or more interleaving patterns periodically or alternatively switched over OFDM symbols of two or more duplicated RUs of the at least one RU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, Zig Bee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 5 is a diagram of an example design under a proposed scheme in accordance with the present disclosure.

FIG. 31 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to performance enhancement of RU duplication with predefined interleaving patterns in wireless communications. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, a bandwidth of 500 MHz may be interchangeably denoted as BW500 or BW500M, a bandwidth of 520 MHz may be interchangeably denoted as BW520 or BW520M, a bandwidth of 540 MHz may be interchangeably denoted as BW540 or BW540M, a bandwidth of 640 MHz may be interchangeably denoted as BW640 or BW640M.

Figure 1:
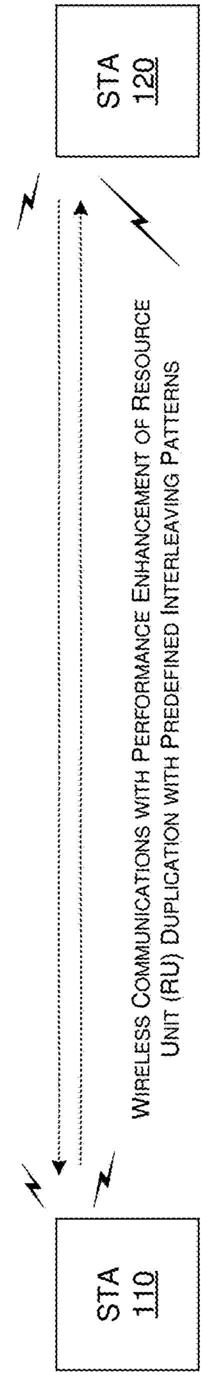
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 31 illustrate examples of implementation of various proposed schemes in network environment 100 in accordance with the present disclosure. The following description of various proposed schemes is provided with reference to FIG. 1~FIG. 31.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the various proposed schemes of performance enhancement of RU duplication with predefined interleaving patterns in wireless communications in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
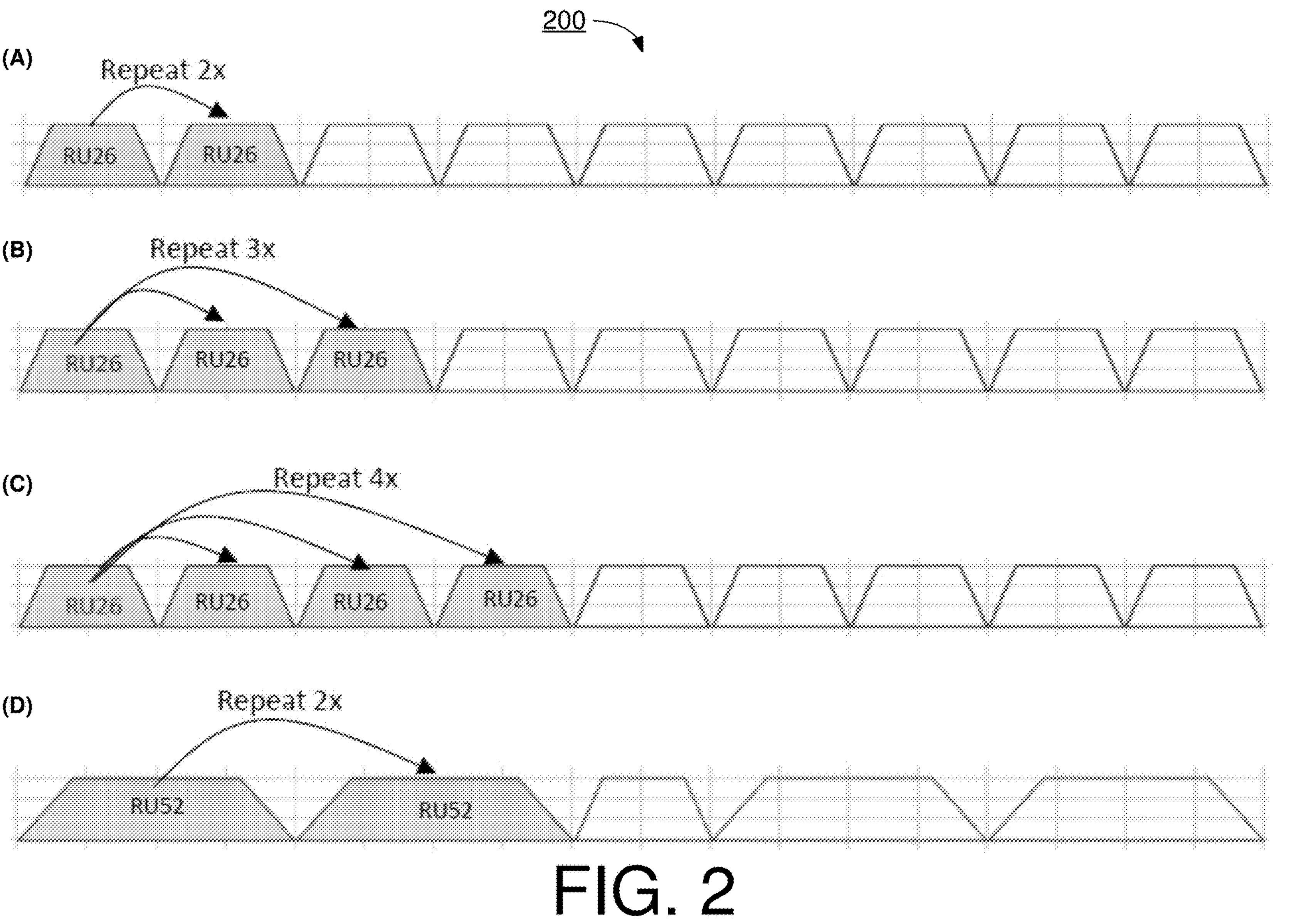
FIG. 2 is a diagram of an example design under a proposed scheme in accordance with the present disclosure.

FIG. 2 illustrates an example design 200 under a proposed scheme in accordance with the present disclosure. Design 200 may pertain to duplication of RU26 and RU52 with different numbers of repetition/duplication. Part (A) of FIG. 2 shows two times (2×) of duplication of a RU26. Part (B) of FIG. 2 shows three times (3×) of duplication of a RU26.

Part (C) of FIG. 2 shows four times (4×) of duplication of a RU26. Part (D) of FIG. 2 shows two times (2×) of duplication of a RU52. In design 200, a given RU (e.g., RU26 or RU52) may be duplicated continuously such that duplications of the RU are adjacent to one another (e.g., contiguous) in the frequency domain.

Figure 3:
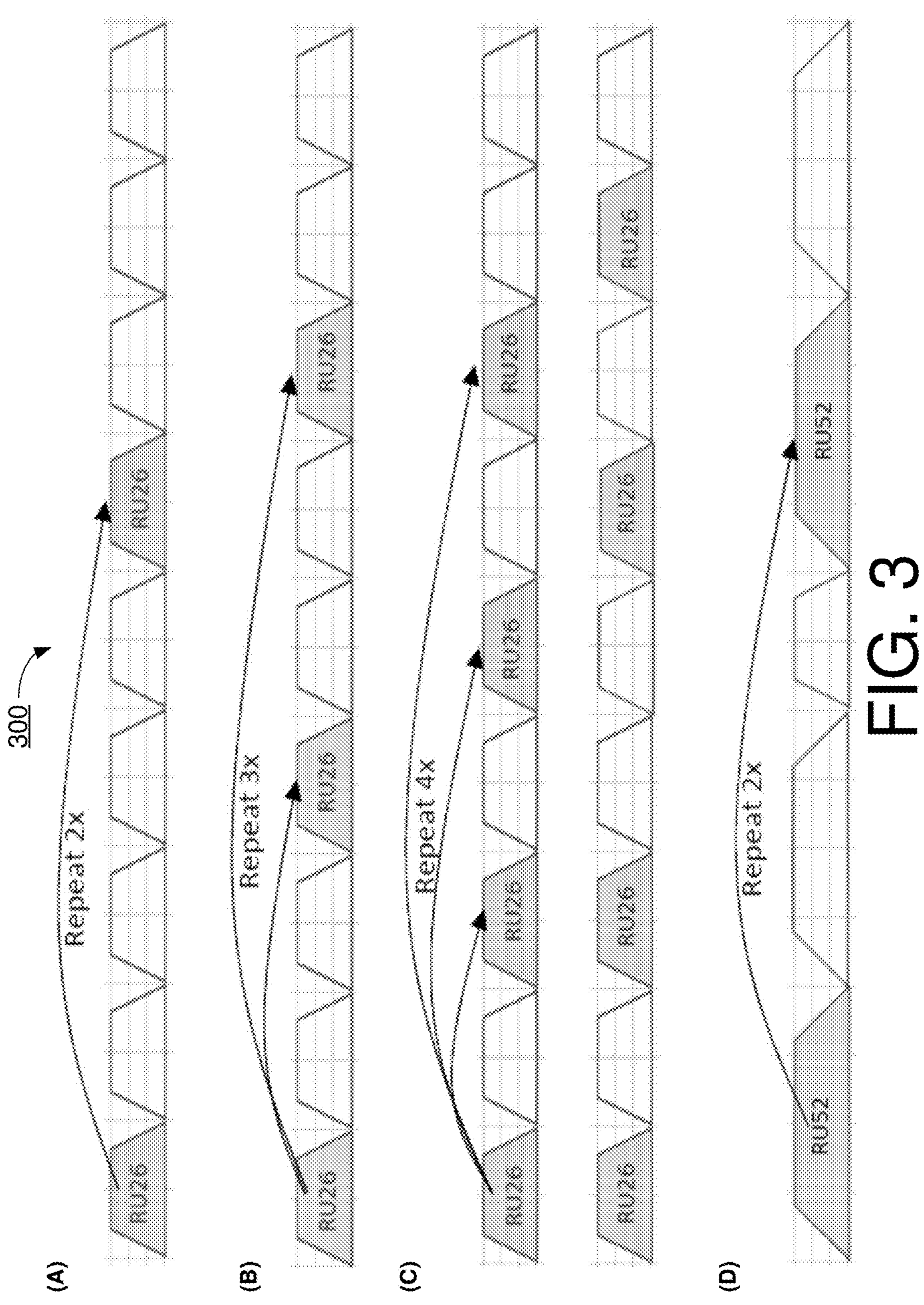
FIG. 3 is a diagram of an example design under a proposed scheme in accordance with the present disclosure.

FIG. 3 illustrates an example design 300 under a proposed scheme in accordance with the present disclosure. Design 300 may pertain to RU duplication with predefined interleaving patterns. To further improve the PER performance and achieve better diversity gain, in design 300, RU duplication may be performed with predefined interleaving patterns. Part (A) of FIG. 3 shows two times (2×) of duplication of a RU26 with a predefined interleaving pattern. Part (B) of FIG. 3 shows three times (3×) of duplication of a RU26 with a predefined interleaving pattern. Part (C) of FIG. 3 shows four times (4×) of duplication of a RU26 with a predefined interleaving pattern. Part (D) of FIG. 3 shows two times (2×) of duplication of a RU52 with a predefined interleaving pattern. Compared to design 200, in design 300 duplications of the RU are not adjacent to one another (e.g., not contiguous) in the frequency domain.

Figure 4:
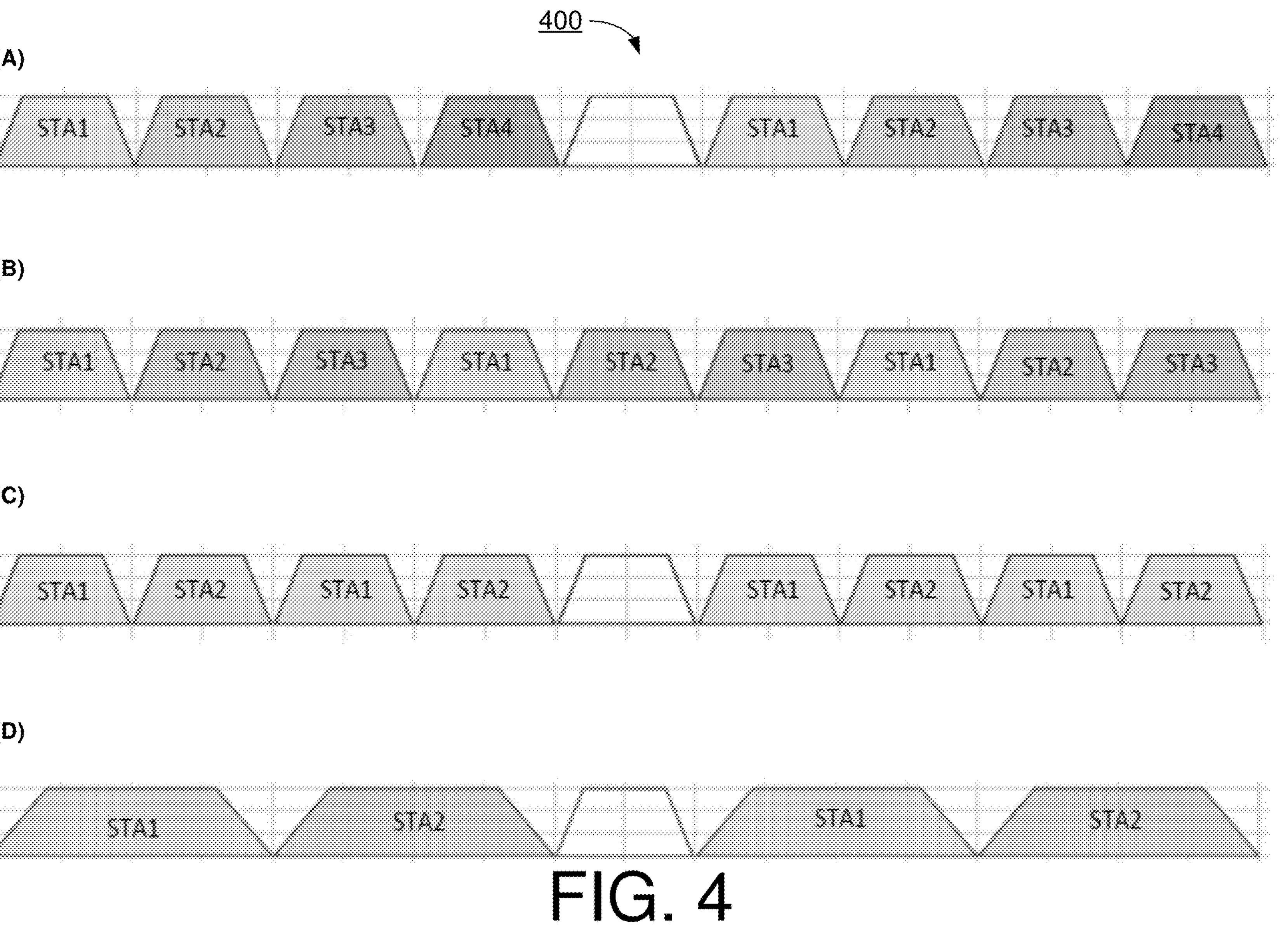
FIG. 4 is a diagram of an example design under a proposed scheme in accordance with the present disclosure.

FIG. 4 illustrates an example design 400 under a proposed scheme in accordance with the present disclosure. Design 400 may pertain to interleaved RU duplication for orthogonal frequency-division multiple-access (OFDMA) multi-users. Part (A) of FIG. 4 shows two times (2×) of duplication of respective RU26 for four users with a predefined interleaving pattern. Part (B) of FIG. 4 shows three times (3×) of duplication of respective RU26 for three users with a predefined interleaving pattern. Part (C) of FIG. 4 shows four times (4×) of duplication of respective RU26 for two users with a predefined interleaving pattern. Part (D) of FIG. 4 shows two times (2×) of duplication of respective RU52 for two users with a predefined interleaving pattern.

Figure 5:
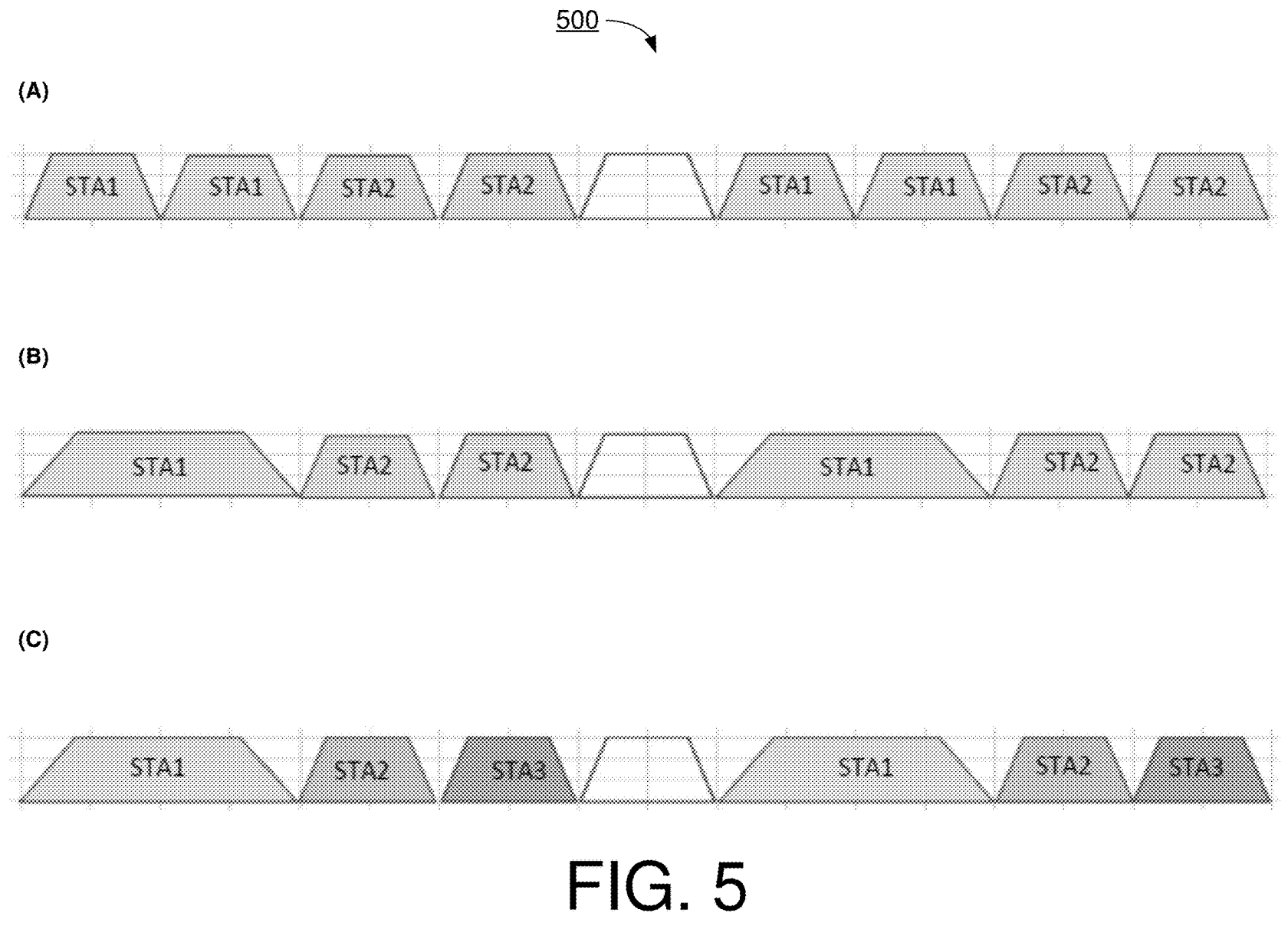

FIG. 5 illustrates an example design 500 under a proposed scheme in accordance with the present disclosure. Design 500 may pertain to interleaved RU duplication for OFDMA multi-users. To enable OFDMA multi-users with different sized or different number of repetition times in interleaved RU duplication, RU26 with four times (4×) of duplication may also be performed. Part (A) of FIG. 5 shows four times (4×) of duplication of respective RU26 for two users (e.g., STA1 and STA2) with a predefined interleaving pattern. Part (B) of FIG. 5 shows two times (2×) of duplication of respective RU52 for a first user (e.g., STA1) and four times (4×) of duplication of respective RU26 for a second user (e.g., STA2) with a predefined interleaving pattern. Part (C) of FIG. 5 shows two times (2×) of duplication of respective RU52 for a first user (e.g., STA1) and two times (2×) of duplication of respective RU26 for two users (e.g., STA2 and STA3) with a predefined interleaving pattern.

Figure 6:
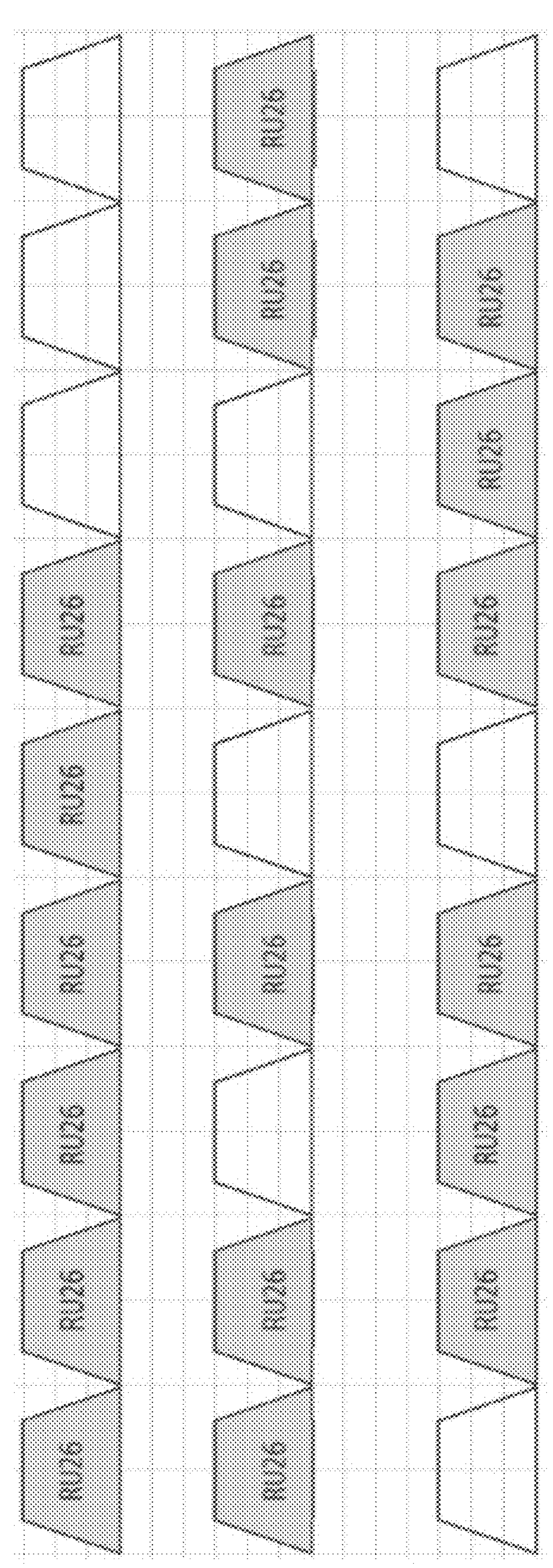
FIG. 6 is a diagram of an example design under a proposed scheme in accordance with the present disclosure.

FIG. 6 illustrates an example design 600 under a proposed scheme in accordance with the present disclosure. Design 600 may pertain to RU duplication with a predefined interleaving pattern. Referring to FIG. 6, an example of six times (6×) of duplication of a RU26 with a predefined interleaving pattern.

Under a proposed scheme in accordance with the present disclosure, interleaved RU duplication (e.g., RU duplication or repetition with a predefined interleaving pattern) may be operated under either of two options. In a first option (Option-1), the same interleaving pattern may be kept with no change across OFDM symbols. In a second option (Option-2), interleaving patterns may be periodically or alternatively switched over OFDM symbols.

Figure 7:
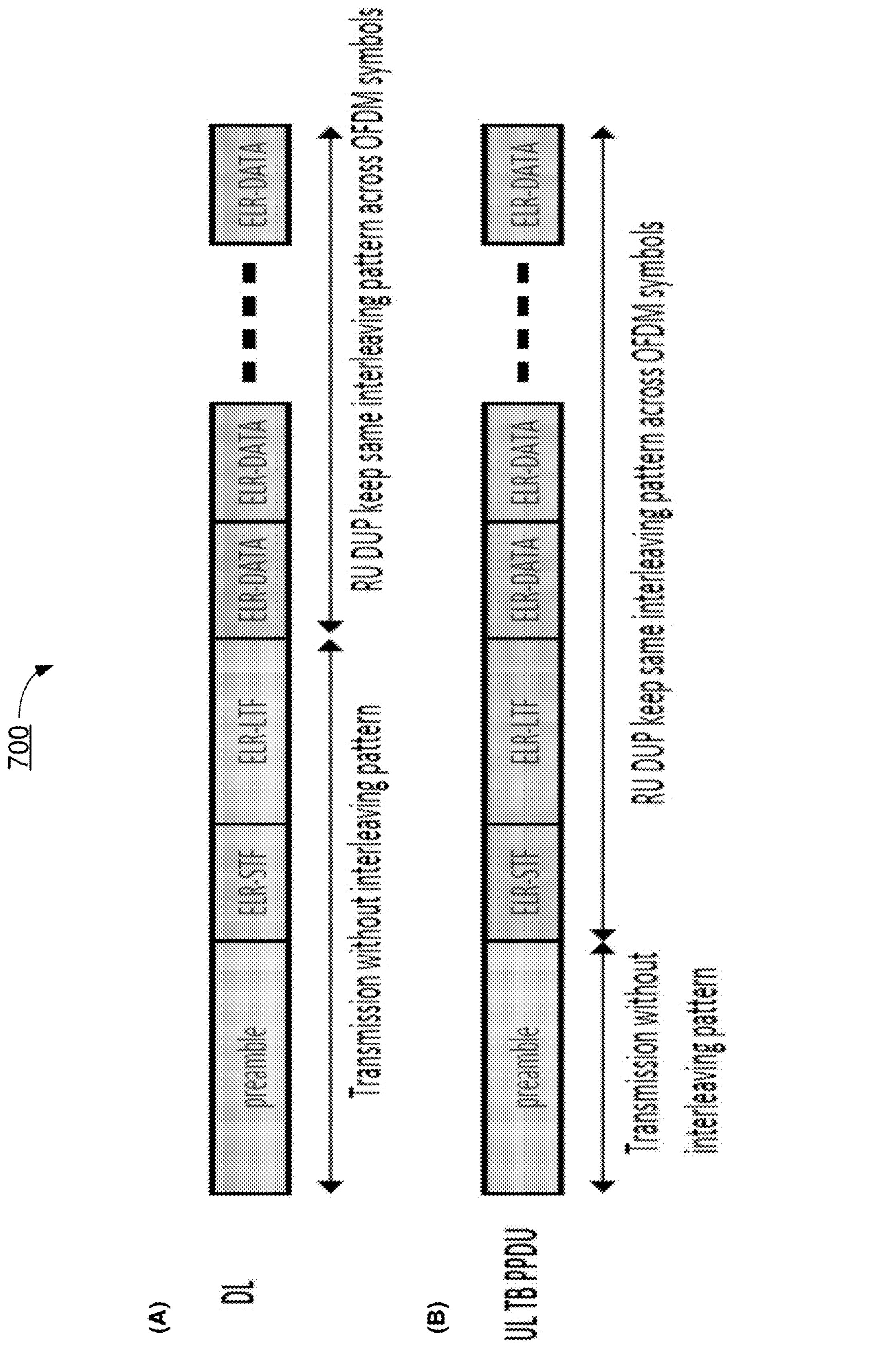
FIG. 7 is a diagram of an example scenario under a proposed scheme in accordance with the present disclosure.

FIG. 7 illustrates an example scenario 700 under the proposed scheme with respect to Option-1. Part (A) of FIG. 7 shows an example of downlink (DL) transmission of an enhanced long range (ELR) physical-layer protocol data unit (PPDU) in which the preamble, ELR short training field (ELR-STF) and ELR long training field (ELR-LTF) are transmitted without any interleaving pattern, while transmission of RU(s) of an ELR data (ELR-DATA) is performed with RU duplication in the frequency domain using the same interleaving pattern across OFDM symbols of the ELR data. Part (B) of FIG. 7 shows an example of uplink (UL) transmission of a trigger-based (TB) PPDU with the preamble transmitted without any interleaving pattern, while transmission of RUs of the ELR-STF, ELR-LTF and ELR-DATA is performed with RU duplication in the frequency domain using the same interleaving pattern across OFDM symbols of the ELR-STF, ELR-LTF and ELR data.

Figure 8:
FIG. 8 is a diagram of an example scenario under a proposed scheme in accordance with the present disclosure.

FIG. 8 illustrates an example scenario 800 under the proposed scheme with respect to Option-2. Specifically, FIG. 8 shows an example of DL transmission of an ELR PPDU with the preamble, ELR short training field (ELR-STF), ELR long training field (ELR-LTF) are transmitted without any interleaving pattern, while transmission of RU(s) of an ELR-DATA is performed with RU duplication in the frequency domain with interleaving patterns periodically or alternatively switched over OFDM symbols. For instance, as shown in FIG. 8, a first interleaving pattern (interleaving pattern-1) may be used in RU duplication for a first repetition of ELR-DATA, a second interleaving pattern (interleaving pattern-2) may be used in RU duplication for a second repetition of ELR-DATA, the first interleaving pattern (interleaving pattern-1) may be used in RU duplication for a third repetition of ELR-DATA, the second interleaving pattern (interleaving pattern-2) may be used in RU duplication for a fourth repetition of ELR-DATA, and so on. It is noteworthy that Option-2 may be applicable in DL PPDU transmission scenarios but may not be applicable in other transmission scenarios.

Figure 9:
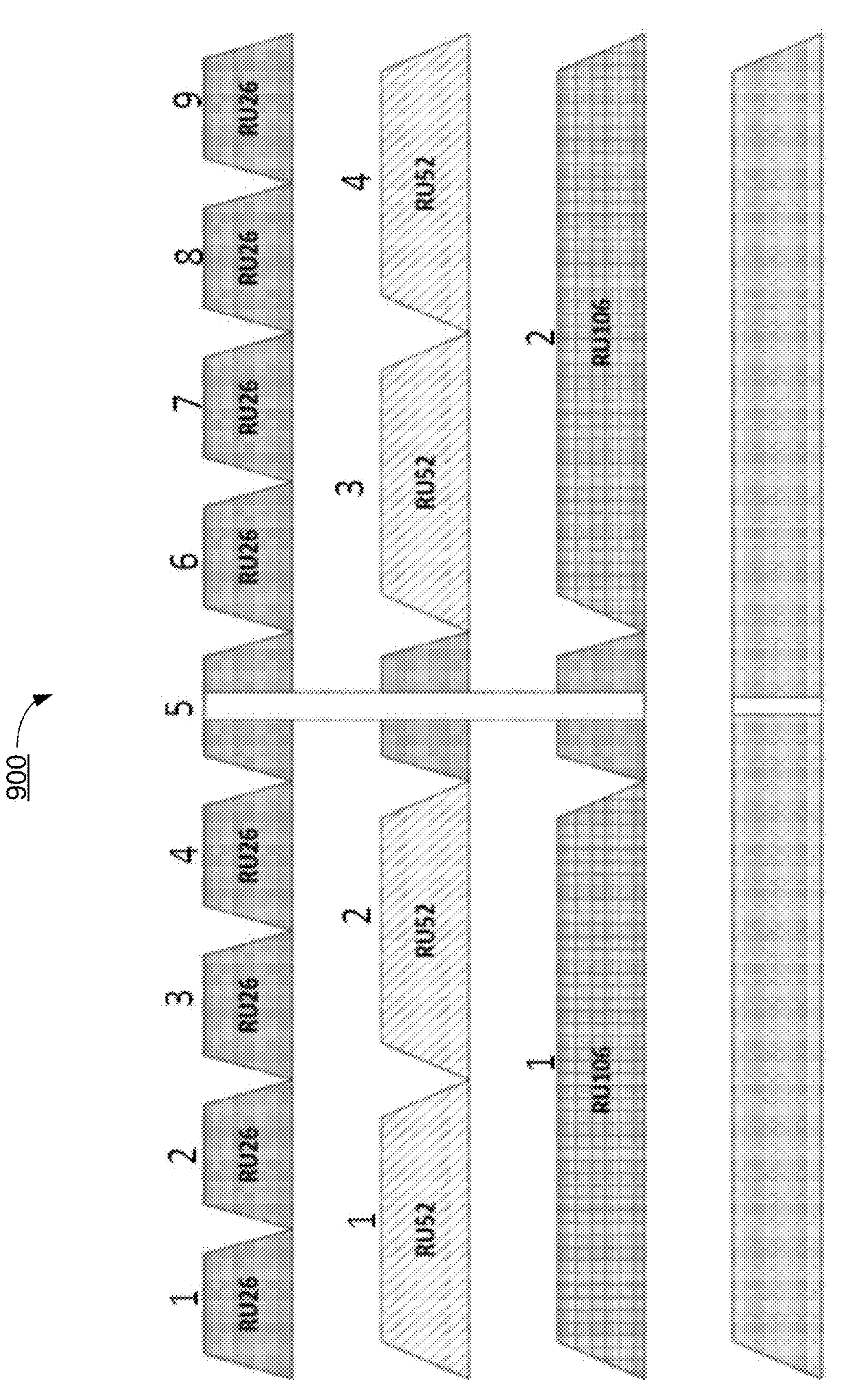
FIG. 9 is a diagram of an example design under a proposed scheme in accordance with the present disclosure.

FIG. 9 illustrates an example design 900 under a proposed scheme in accordance with the present disclosure. Design 900 may pertain to a BW20 RU hierarchical structure and index. Referring to FIG. 9, in design 900, a RU26 may be duplicated nine times, a RU52 may be duplicated four times, and a RU106 may be duplicated two times in the BW20.

Figure 10:
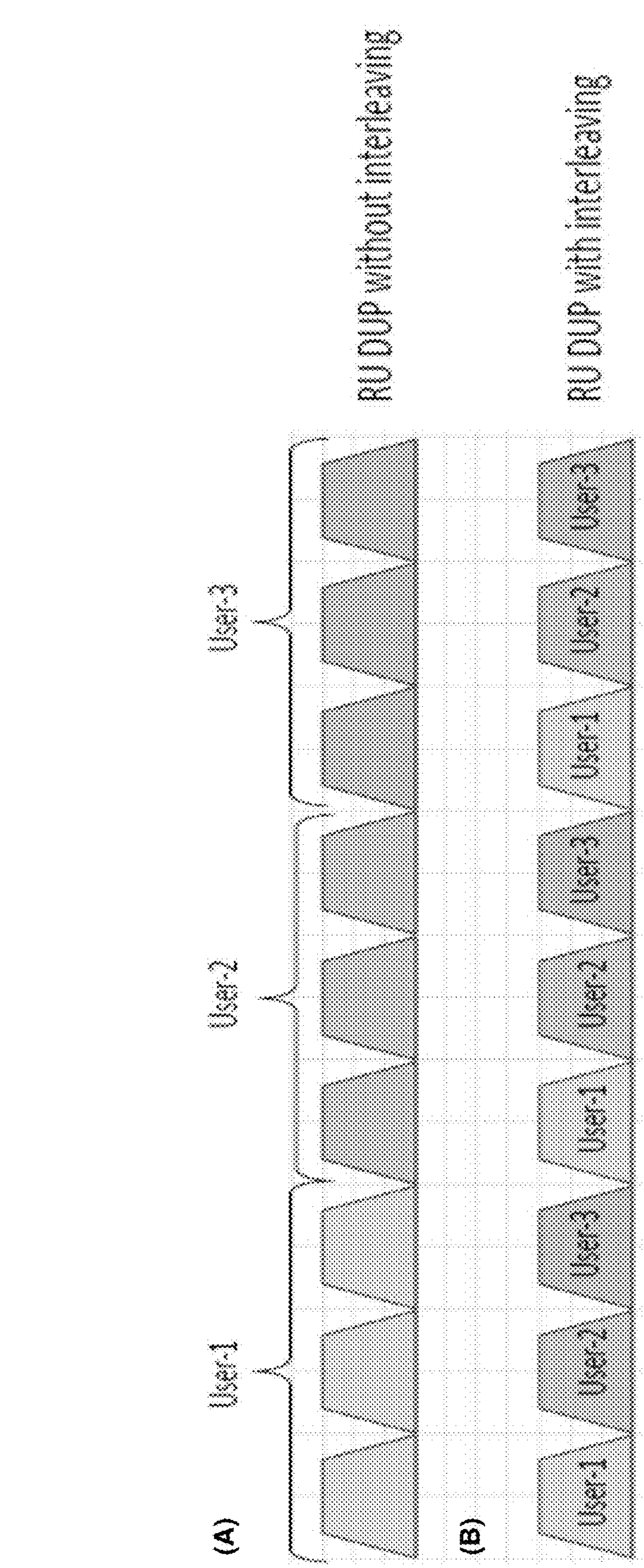
FIG. 10 is a diagram of an example scenario under a proposed scheme in accordance with the present disclosure.

FIG. 10 illustrates an example scenario 1000 under a proposed scheme in accordance with the present disclosure. Scenario 1000 may pertain to three times (3×) of duplication of a RU26 for three users (e.g., user-1, user-2 and user-3). Part (A) of FIG. 10 shows an example of RU duplication without interleaving for the three users. Part (B) of FIG. 10 shows an example of RU duplication with interleaving.

Figure 11:
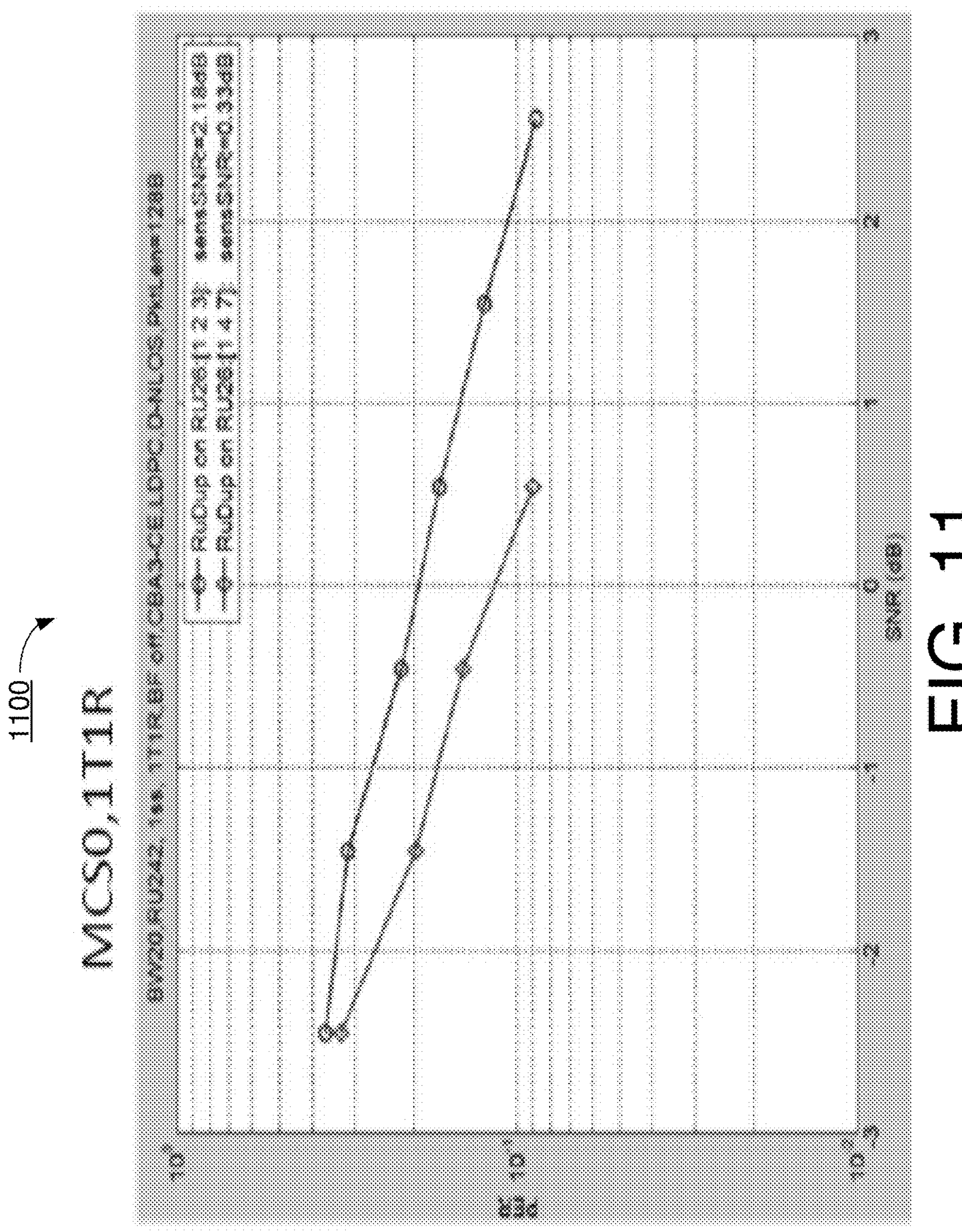
FIG. 11 is a diagram of an example scenario under a proposed scheme in accordance with the present disclosure.

FIG. 11 illustrates an example scenario 1100 under a proposed scheme in accordance with the present disclosure. Scenario 1100 may pertain to PER performance comparisons in simulation with respect to the 3×RU duplication of scenario 1000. The simulation utilized a modulation and coding scheme (MCS) of MCSO with respect to a STA (e.g., STA 110 or STA 120) with one transmitter antenna and one receiver antenna (1T1R) using one spatial stream (1ss) in BW20 with RU26 duplication. The "RU242" of the FIG. 11 means that RU26 is duplicated within the tone range of 20 MHz or RU242. This meaning can be applied to the figures hereafter, such as FIG. 12 to FIG. 17, FIG. 19 to FIG. 24 and FIG. 26 to FIG. 29, as the simulations were conducted in the context of a 242-tone RU. The upper curve in the graph represents a simulation result of RU duplication without interleaving. The lower curve in the graph represents a simulation result of RU duplication with interleaving.

Figure 12:
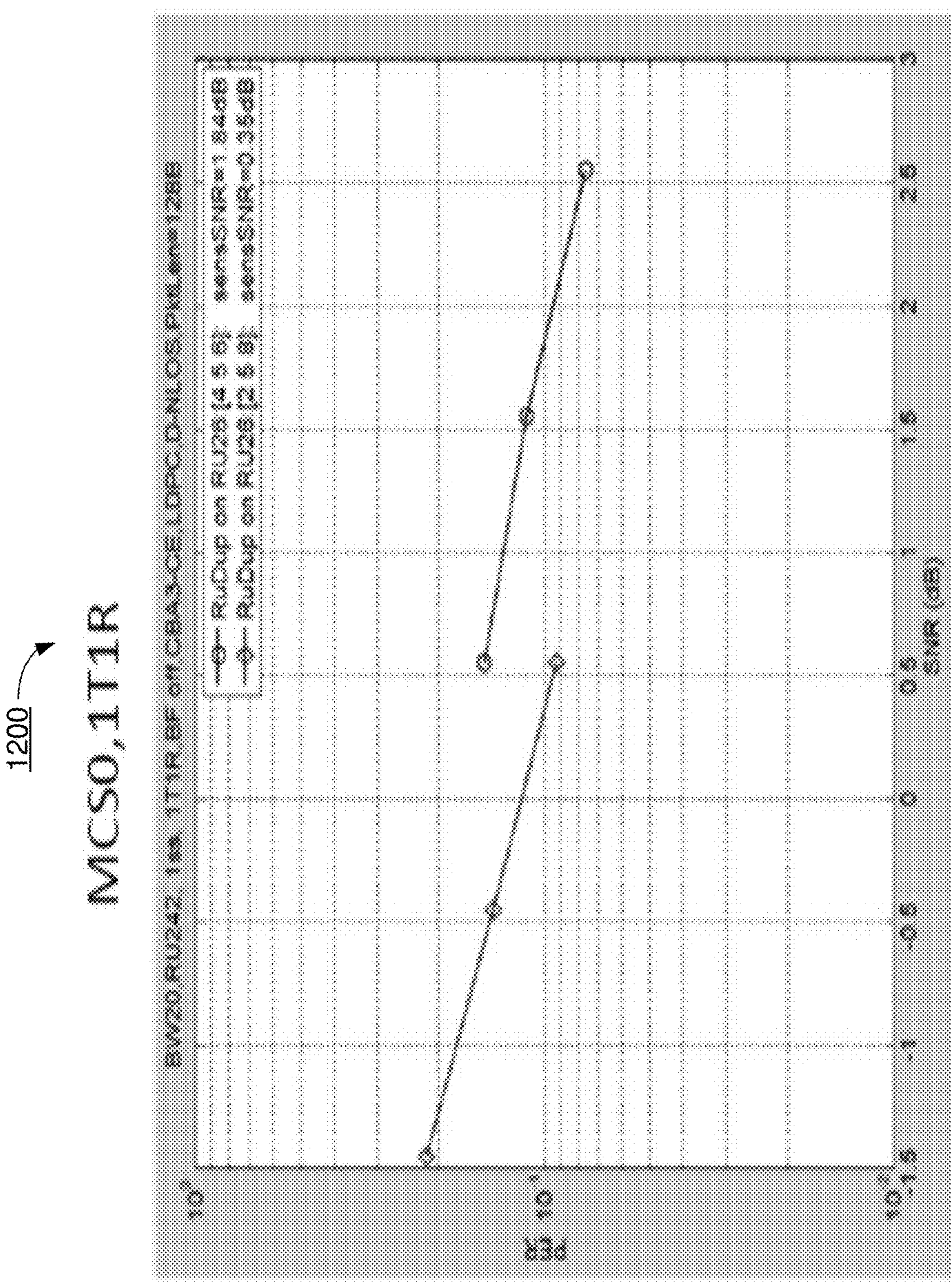
FIG. 12 is a diagram of an example scenario under a proposed scheme in accordance with the present disclosure.

FIG. 12 illustrates an example scenario 1200 under a proposed scheme in accordance with the present disclosure. Scenario 1200 may pertain to PER performance comparisons in simulation with respect to the 3×RU duplication of scenario 1000. The simulation utilized MCSO with respect to a STA (e.g., STA 110 or STA 120) with 1T1R using 1ss in BW20 with RU26 duplication. The curve to the right in the graph represents a simulation result of RU duplication without interleaving. The curve to the left in the graph represents a simulation result of RU duplication with interleaving.

Figure 13:
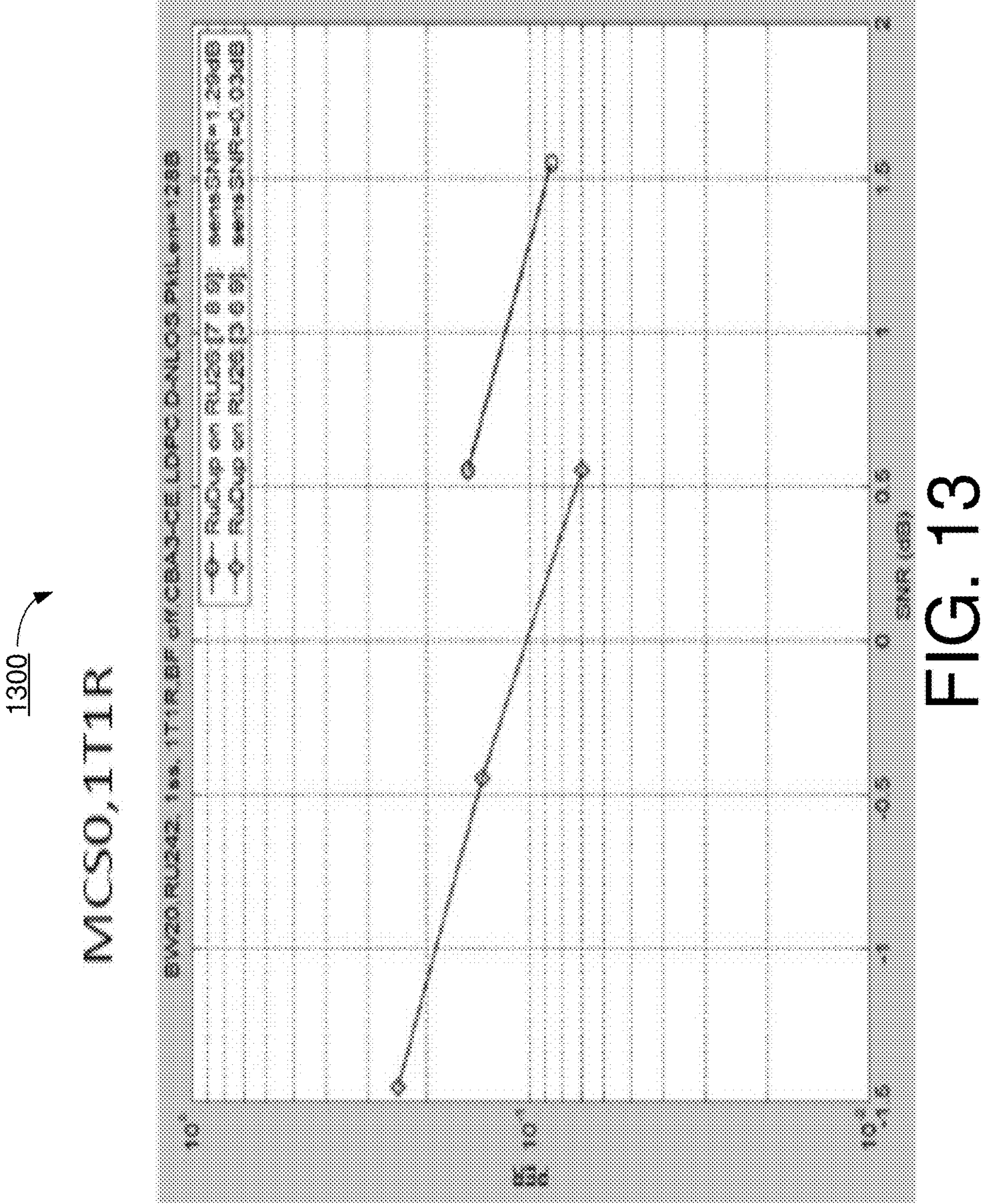
FIG. 13 is a diagram of an example scenario under a proposed scheme in accordance with the present disclosure.

FIG. 13 illustrates an example scenario 1300 under a proposed scheme in accordance with the present disclosure. Scenario 1300 may pertain to PER performance comparisons in simulation with respect to the 3×RU duplication of scenario 1000. The simulation utilized MCSO with respect to a STA (e.g., STA 110 or STA 120) with 1T1R using 1ss in BW20 with RU26 duplication. The curve to the right in the graph represents a simulation result of RU duplication without interleaving. The curve to the left in the graph represents a simulation result of RU duplication with interleaving.

Figure 14:
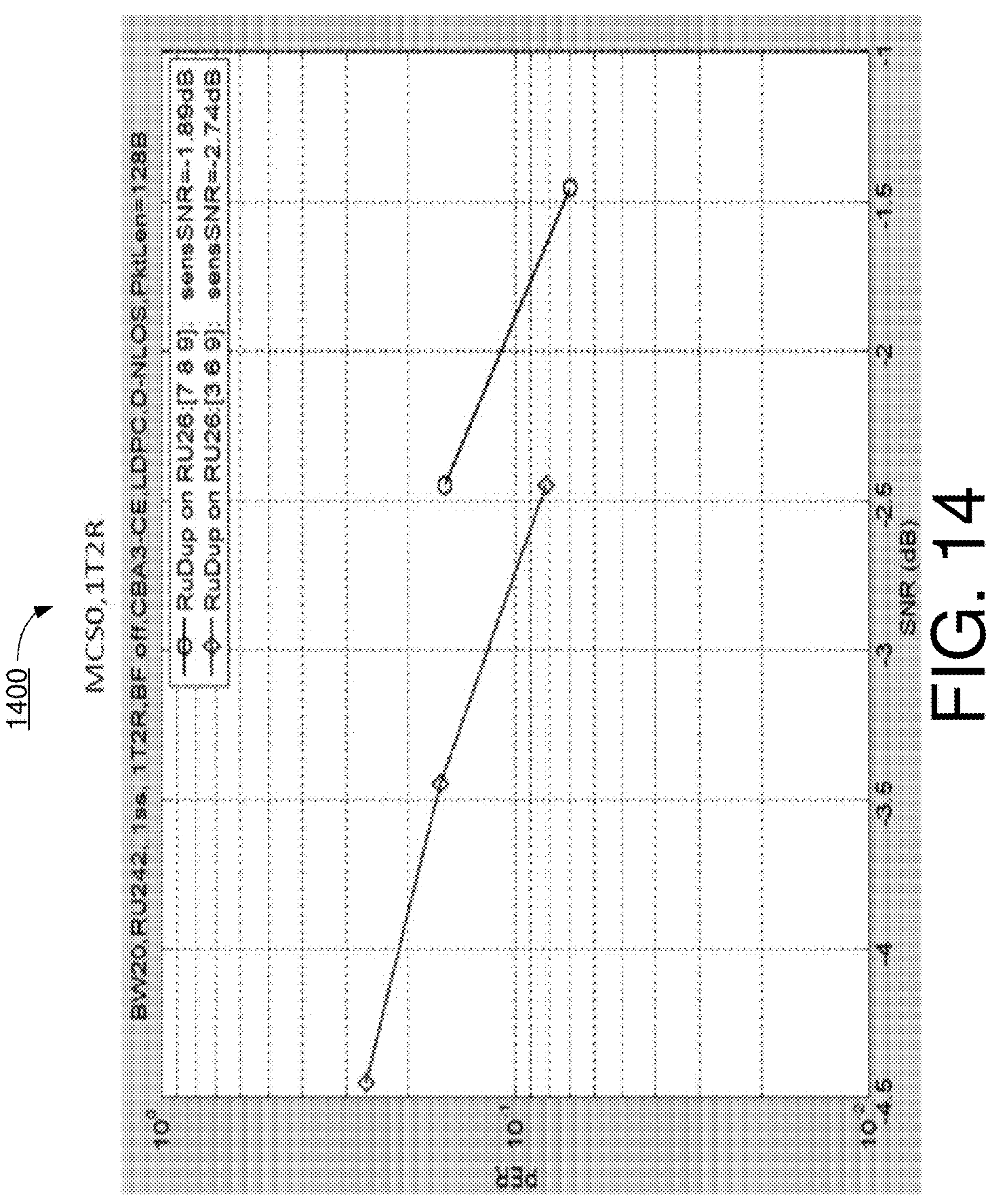
FIG. 14 is a diagram of an example scenario under a proposed scheme in accordance with the present disclosure.

FIG. 14 illustrates an example scenario 1400 under a proposed scheme in accordance with the present disclosure. Scenario 1400 may pertain to PER performance comparisons in simulation with respect to the 3×RU duplication of scenario 1000. The simulation utilized MCSO with respect to a STA (e.g., STA 110 or STA 120) with one transmitter antenna and two receiver antennas (1T2R) using 1ss in BW20 with RU26 duplication. The curve to the right in the graph represents a simulation result of RU duplication without interleaving. The curve to the left in the graph represents a simulation result of RU duplication with interleaving.

Figure 15:
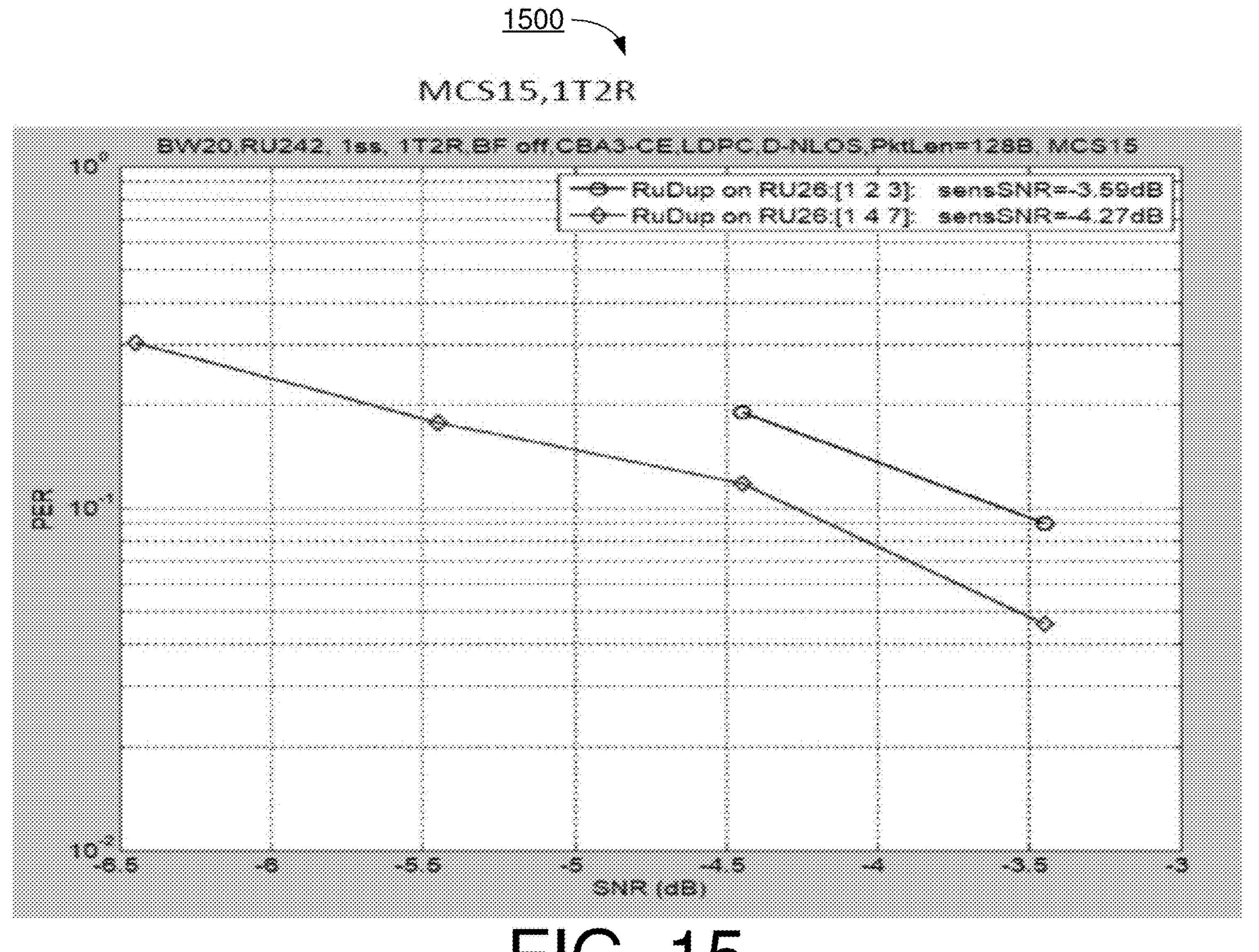
FIG. 15 is a diagram of an example scenario under a proposed scheme in accordance with the present disclosure.

FIG. 15 illustrates an example scenario 1500 under a proposed scheme in accordance with the present disclosure. Scenario 1500 may pertain to PER performance comparisons in simulation with respect to the 3×RU duplication of scenario 1000. The simulation utilized MCS15 with respect to a STA (e.g., STA 110 or STA 120) with 1T2R using 1ss in BW20 with RU26 duplication. The curve to the right in the graph represents a simulation result of RU duplication without interleaving. The curve to the left in the graph represents a simulation result of RU duplication with interleaving.

Figure 16:
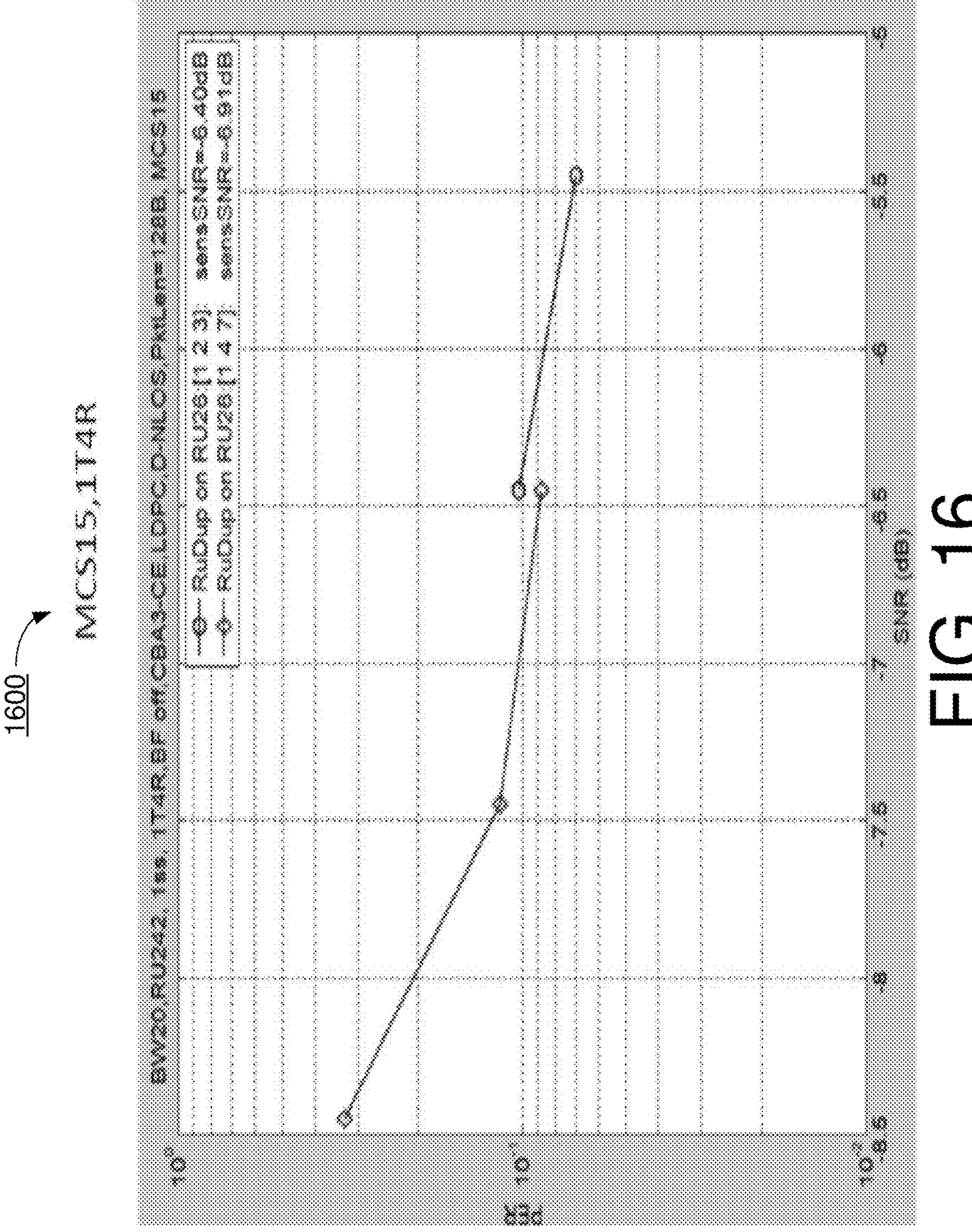
FIG. 16 is a diagram of an example scenario under a proposed scheme in accordance with the present disclosure.

FIG. 16 illustrates an example scenario 1600 under a proposed scheme in accordance with the present disclosure. Scenario 1600 may pertain to PER performance comparisons in simulation with respect to the 3×RU duplication of scenario 1000. The simulation utilized MCS15 with respect to a STA (e.g., STA 110 or STA 120) with one transmitter antenna and four receiver antennas (1T4R) using 1ss in BW20 with RU26 duplication. The curve to the right in the graph represents a simulation result of RU duplication without interleaving. The curve to the left in the graph represents a simulation result of RU duplication with interleaving.

Figure 17:
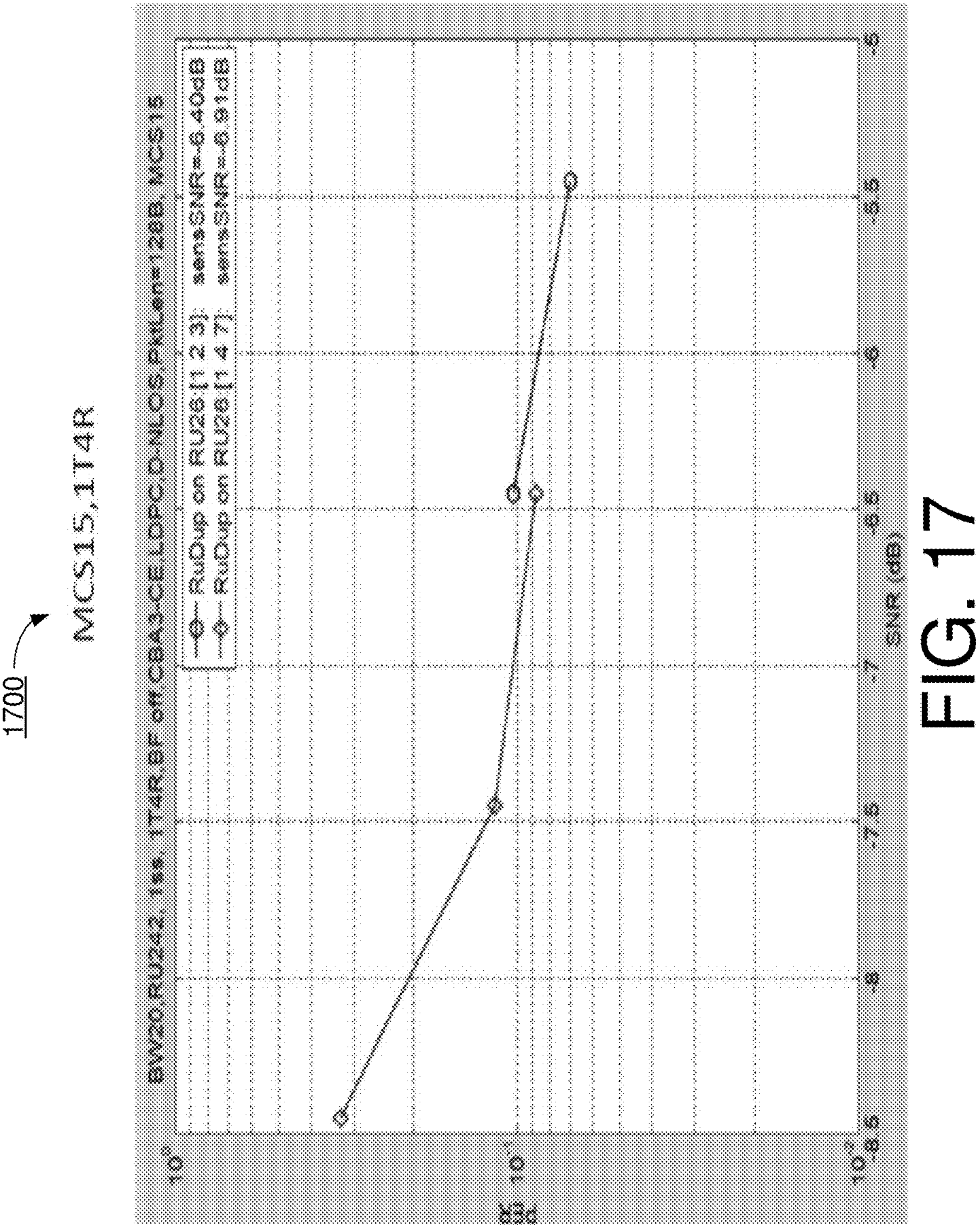
FIG. 17 is a diagram of an example scenario under a proposed scheme in accordance with the present disclosure.

FIG. 17 illustrates an example scenario 1700 under a proposed scheme in accordance with the present disclosure. Scenario 1700 may pertain to PER performance comparisons in simulation with respect to the 3×RU duplication of scenario 1000. The simulation utilized MCS15 with respect to a STA (e.g., STA 110 or STA 120) with 1T4R using 1 ss in BW20 with RU26 duplication. The curve to the right in the graph represents a simulation result of RU duplication without interleaving. The curve to the left in the graph represents a simulation result of RU duplication with interleaving.

Figure 18:
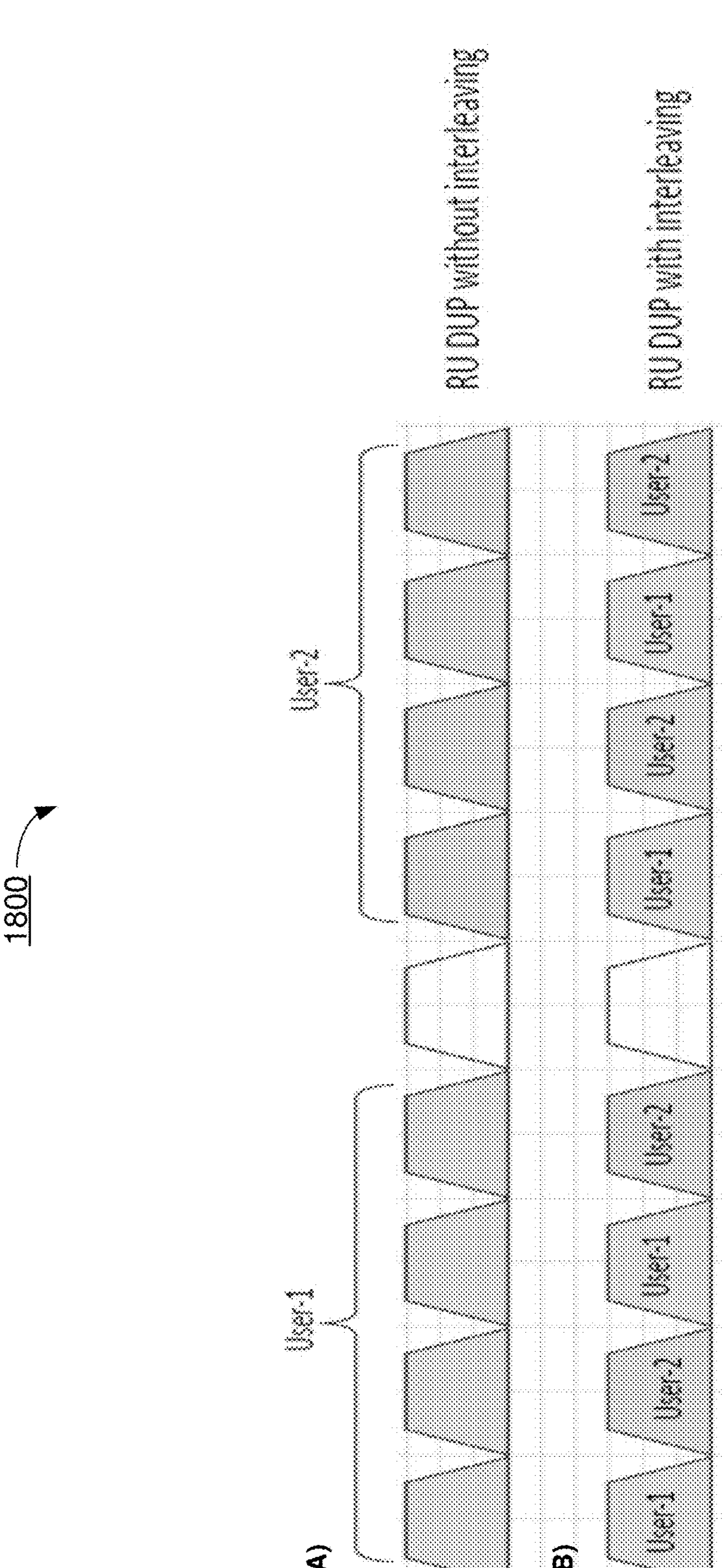
FIG. 18 is a diagram of an example scenario under a proposed scheme in accordance with the present disclosure.

FIG. 18 illustrates an example scenario 1800 under a proposed scheme in accordance with the present disclosure. Scenario 1800 may pertain to four times (4×) of duplication of a RU26 for two users (e.g., user-1 and user-2). Part (A) of FIG. 18 shows an example of RU duplication without interleaving for the three users. Part (B) of FIG. 18 shows an example of RU duplication with interleaving.

Figure 19:
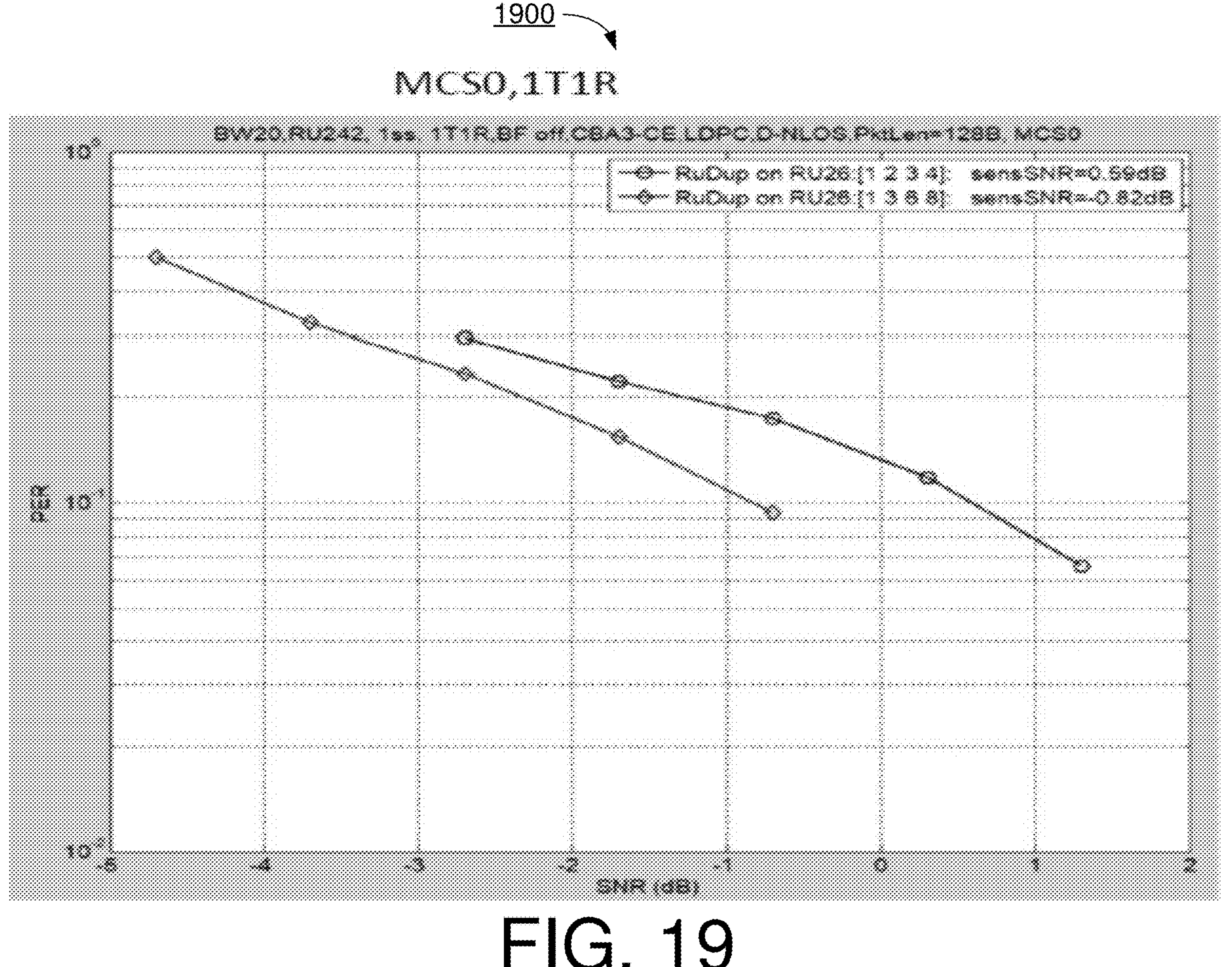
FIG. 19 is a diagram of an example scenario under a proposed scheme in accordance with the present disclosure.

FIG. 19 illustrates an example scenario 1900 under a proposed scheme in accordance with the present disclosure. Scenario 1900 may pertain to PER performance comparisons in simulation with respect to the 4×RU duplication of scenario 1800. The simulation utilized MCSO with respect to a STA (e.g., STA 110 or STA 120) with 1T1R using 1ss in BW20 with RU26 duplication. The curve to the right in the graph represents a simulation result of RU duplication without interleaving. The curve to the left in the graph represents a simulation result of RU duplication with interleaving.

Figure 20:
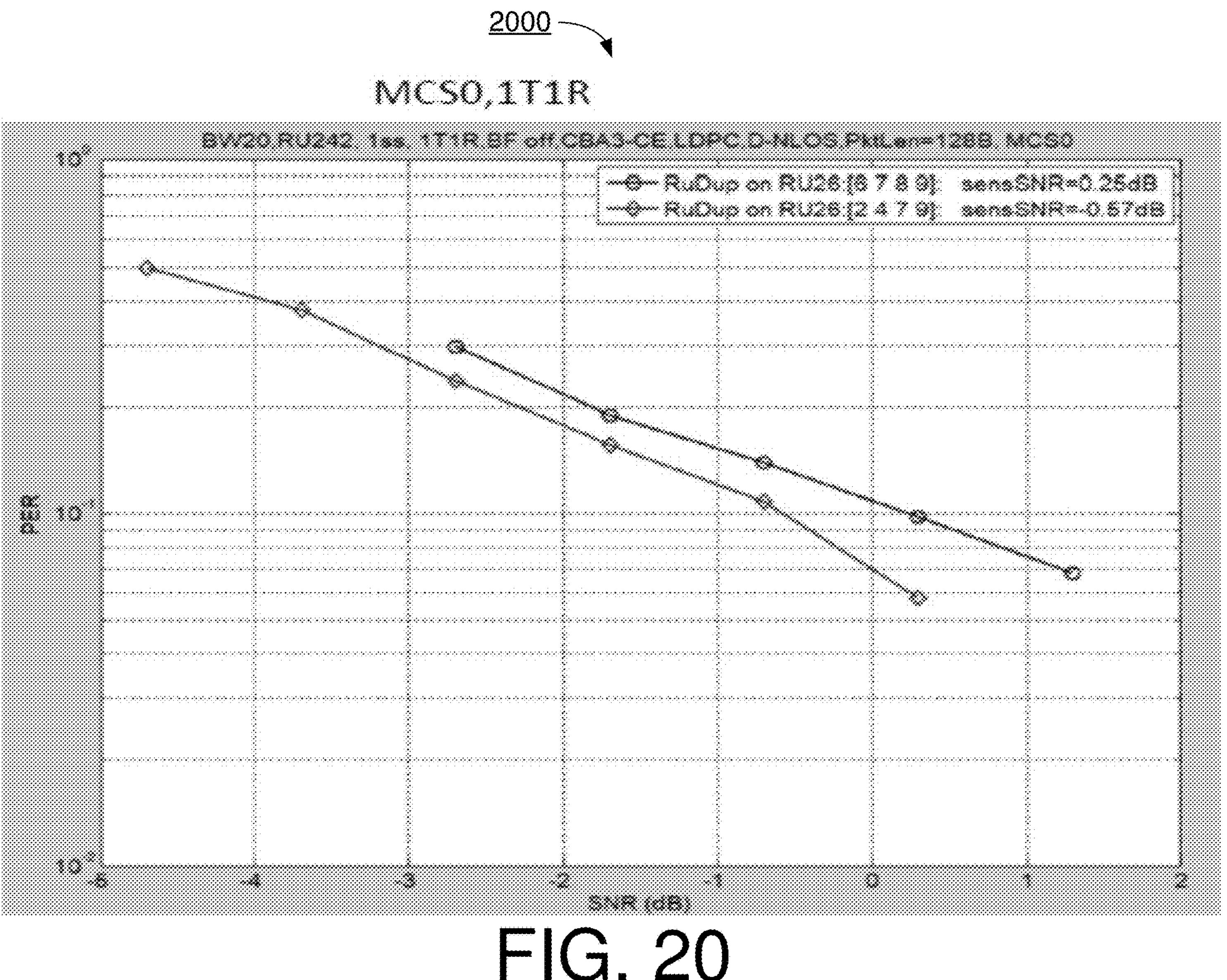
FIG. 20 is a diagram of an example scenario under a proposed scheme in accordance with the present disclosure.

FIG. 20 illustrates an example scenario 2000 under a proposed scheme in accordance with the present disclosure. Scenario 2000 may pertain to PER performance comparisons in simulation with respect to the 4×RU duplication of scenario 1800. The simulation utilized MCSO with respect to a STA (e.g., STA 110 or STA 120) with 1T1R using 1ss in BW20 with RU26 duplication. The curve to the right in the graph represents a simulation result of RU duplication without interleaving. The curve to the left in the graph represents a simulation result of RU duplication with interleaving.

Figure 21:
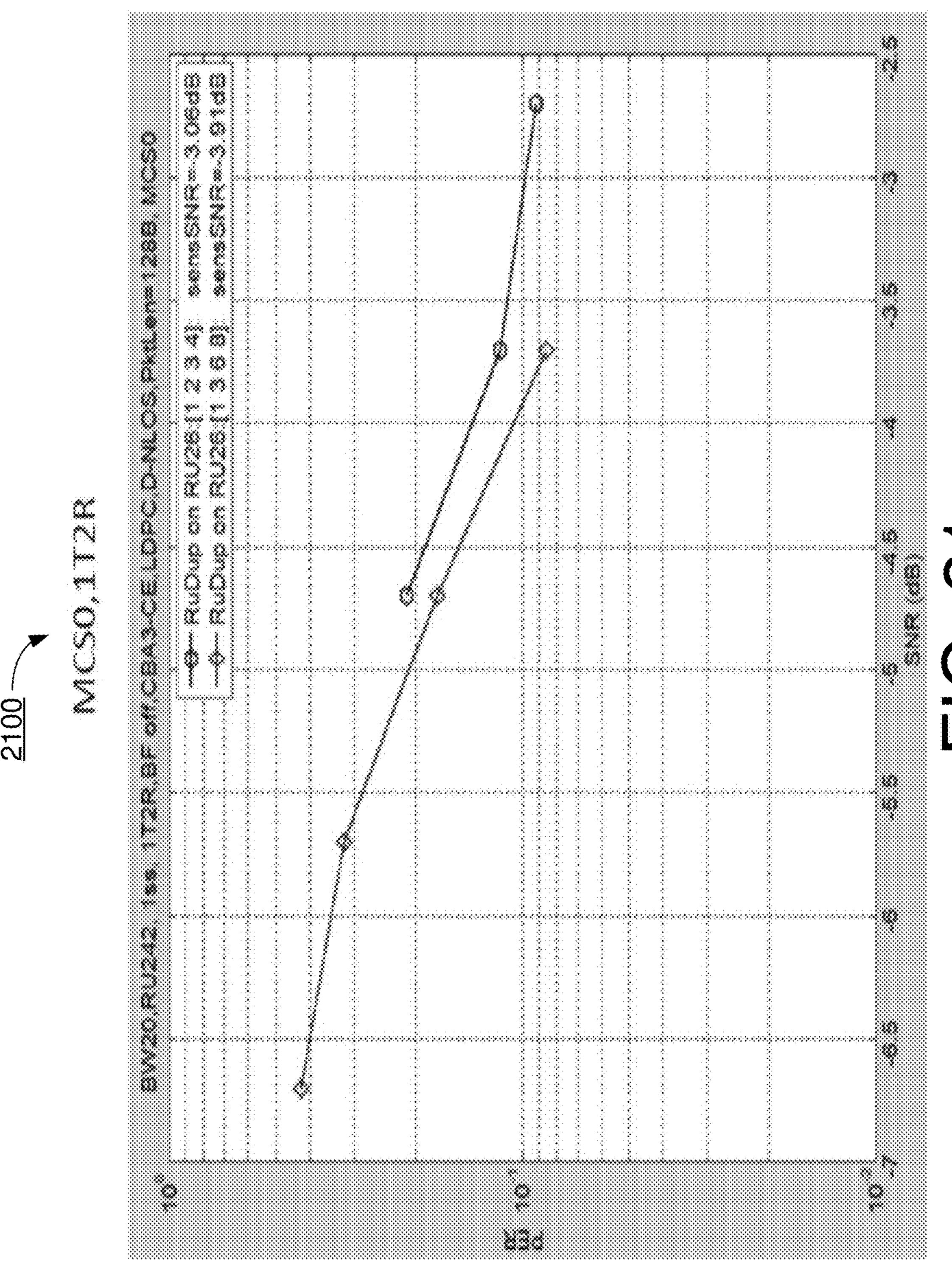
FIG. 21 is a diagram of an example scenario under a proposed scheme in accordance with the present disclosure.

FIG. 21 illustrates an example scenario 2100 under a proposed scheme in accordance with the present disclosure. Scenario 2100 may pertain to PER performance comparisons in simulation with respect to the 4×RU duplication of scenario 1800. The simulation utilized MCSO with respect to a STA (e.g., STA 110 or STA 120) with 1T2R using 1ss in BW20 with RU26 duplication. The curve to the right in the graph represents a simulation result of RU duplication without interleaving. The curve to the left in the graph represents a simulation result of RU duplication with interleaving.

Figure 22:
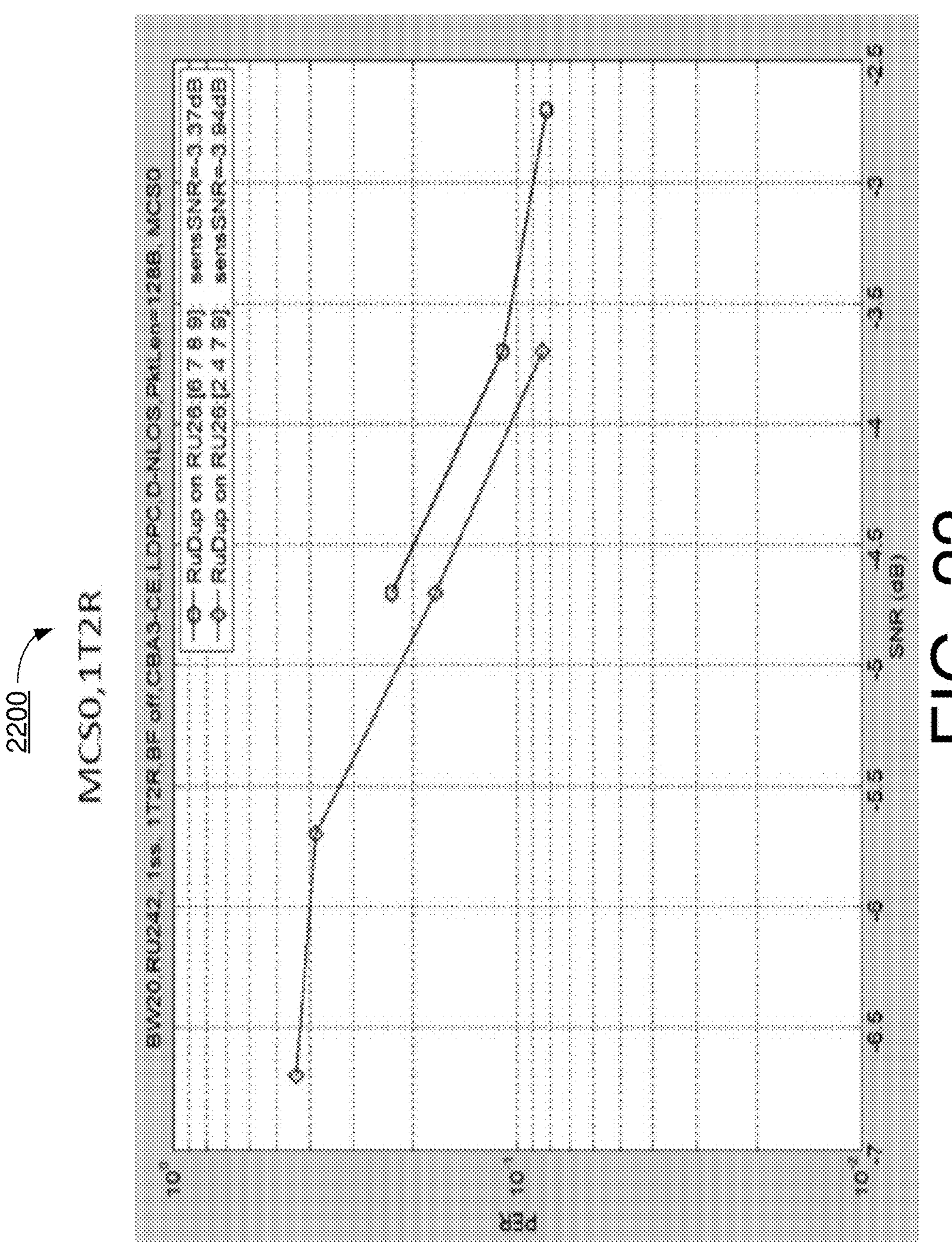
FIG. 22 is a diagram of an example scenario under a proposed scheme in accordance with the present disclosure.

FIG. 22 illustrates an example scenario 2200 under a proposed scheme in accordance with the present disclosure. Scenario 2200 may pertain to PER performance comparisons in simulation with respect to the 4×RU duplication of scenario 1800. The simulation utilized MCSO with respect to a STA (e.g., STA 110 or STA 120) with 1T2R using 1ss in BW20 with RU26 duplication. The curve to the right in the graph represents a simulation result of RU duplication without interleaving. The curve to the left in the graph represents a simulation result of RU duplication with interleaving.

Figure 23:
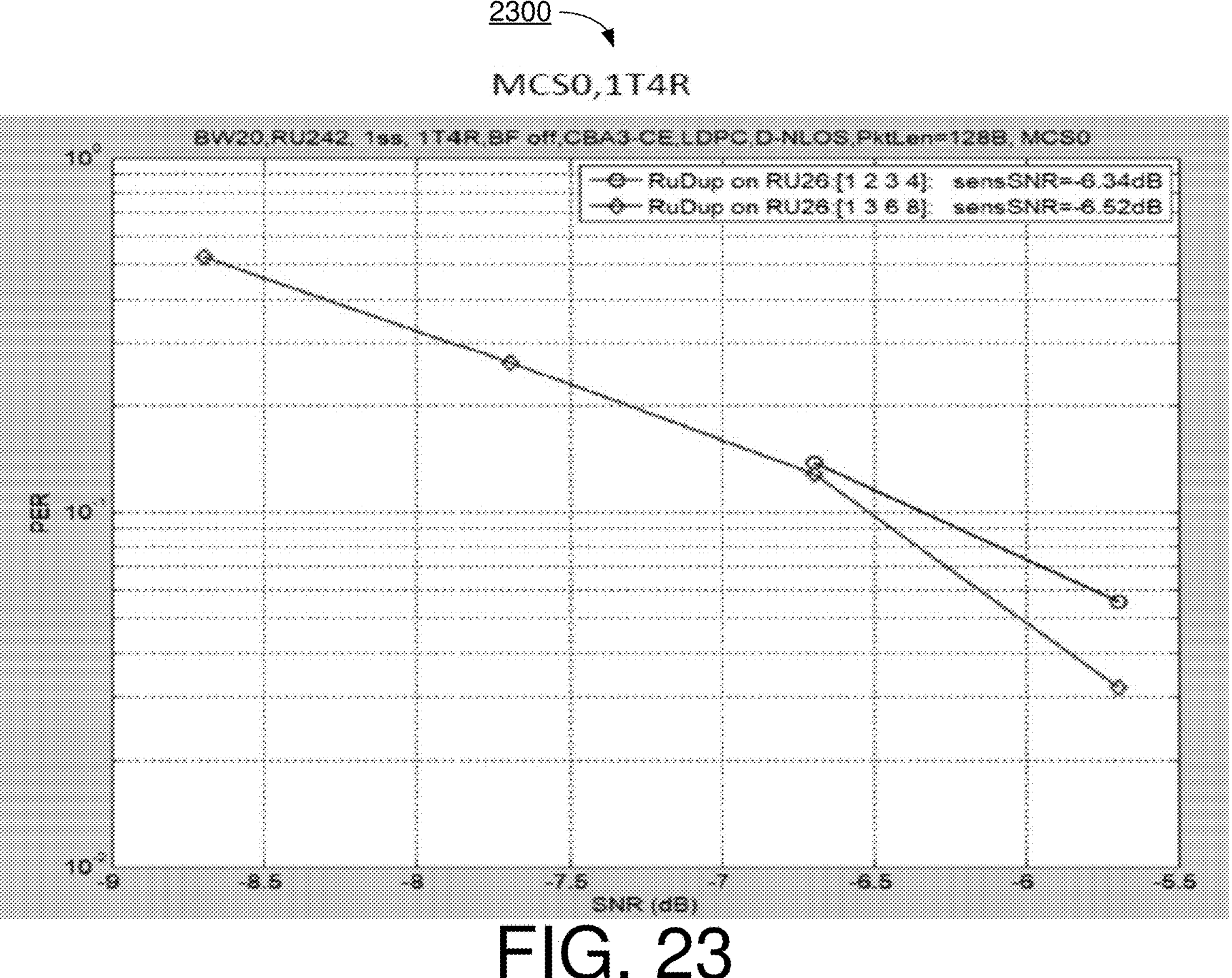
FIG. 23 is a diagram of an example scenario under a proposed scheme in accordance with the present disclosure.

FIG. 23 illustrates an example scenario 2300 under a proposed scheme in accordance with the present disclosure. Scenario 2300 may pertain to PER performance comparisons in simulation with respect to the 4×RU duplication of scenario 1800. The simulation utilized MCSO with respect to a STA (e.g., STA 110 or STA 120) with 1T4R using 1ss in BW20 with RU26 duplication. The curve to the right in the graph represents a simulation result of RU duplication without interleaving. The curve to the left in the graph represents a simulation result of RU duplication with interleaving.

Figure 24:
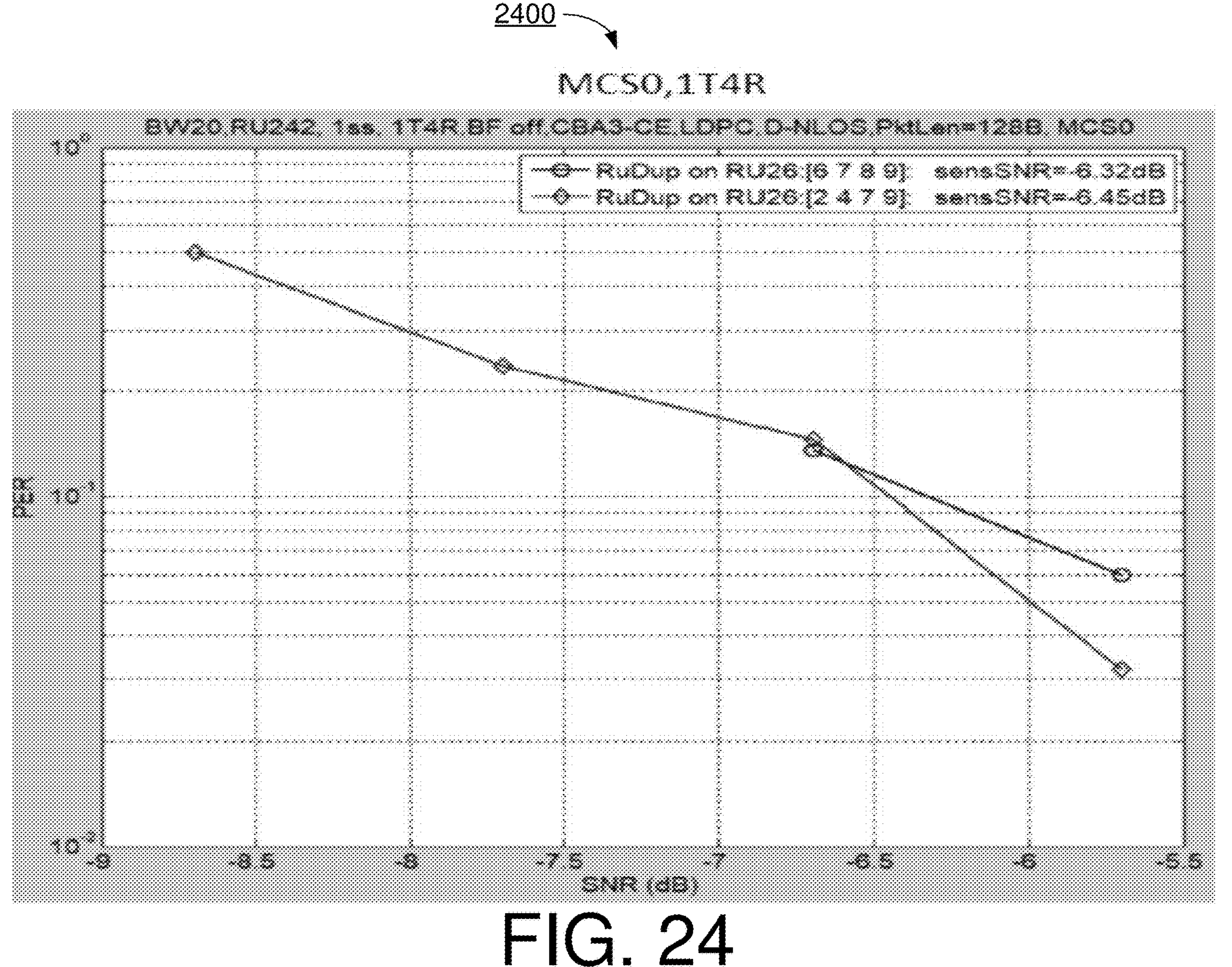
FIG. 24 is a diagram of an example scenario under a proposed scheme in accordance with the present disclosure.

FIG. 24 illustrates an example scenario 2400 under a proposed scheme in accordance with the present disclosure.

Scenario 2400 may pertain to PER performance comparisons in simulation with respect to the 4×RU duplication of scenario 1800. The simulation utilized MCSO with respect to a STA (e.g., STA 110 or STA 120) with 1T4R using 1ss in BW20 with RU26 duplication. The curve to the right in the graph represents a simulation result of RU duplication without interleaving. The curve to the left in the graph represents a simulation result of RU duplication with interleaving.

Figure 25:
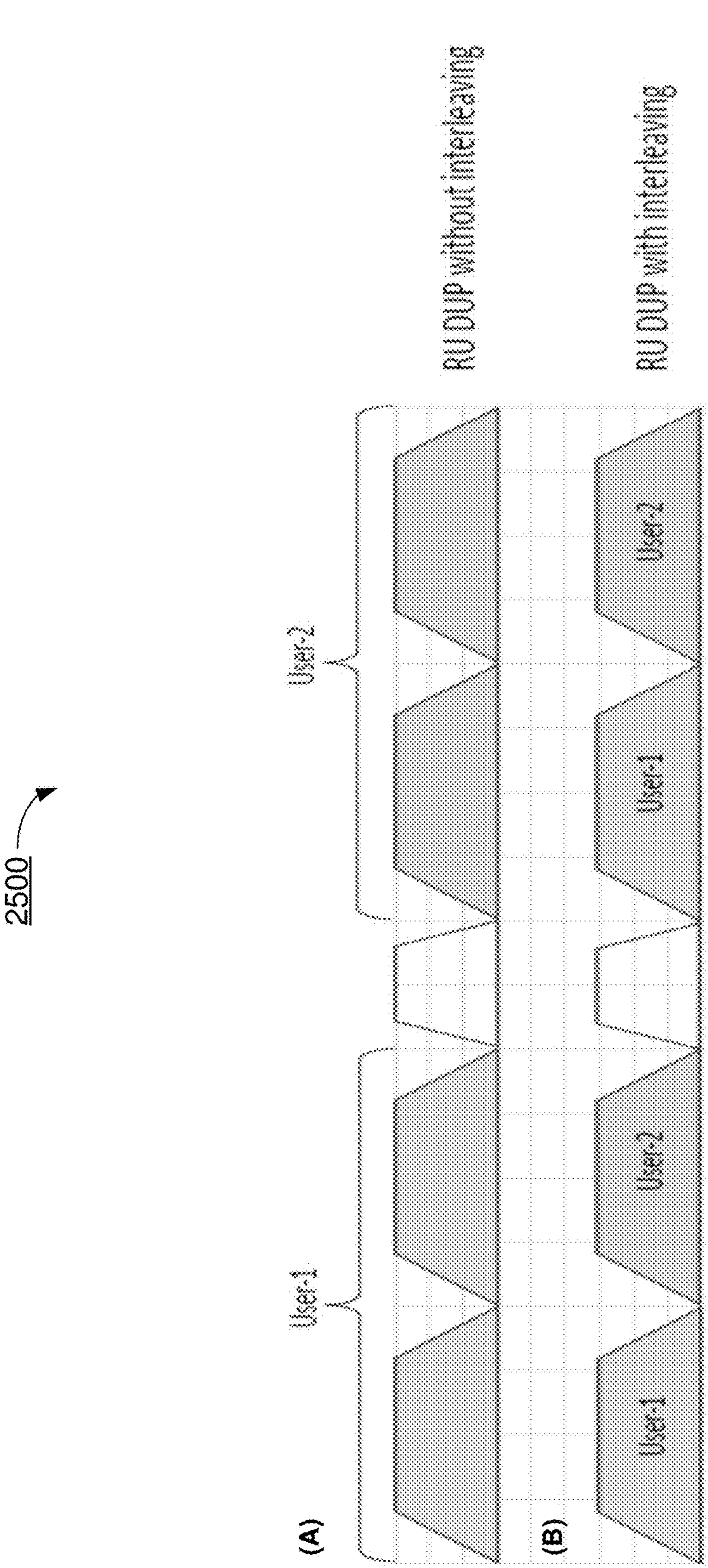
FIG. 25 is a diagram of an example scenario under a proposed scheme in accordance with the present disclosure.

FIG. 25 illustrates an example scenario 2500 under a proposed scheme in accordance with the present disclosure. Scenario 2500 may pertain to two times (2×) of duplication of a RU52 for two users (e.g., user-1 and user-2). Part (A) of FIG. 25 shows an example of RU duplication without interleaving for the three users. Part (B) of FIG. 25 shows an example of RU duplication with interleaving.

Figure 26:
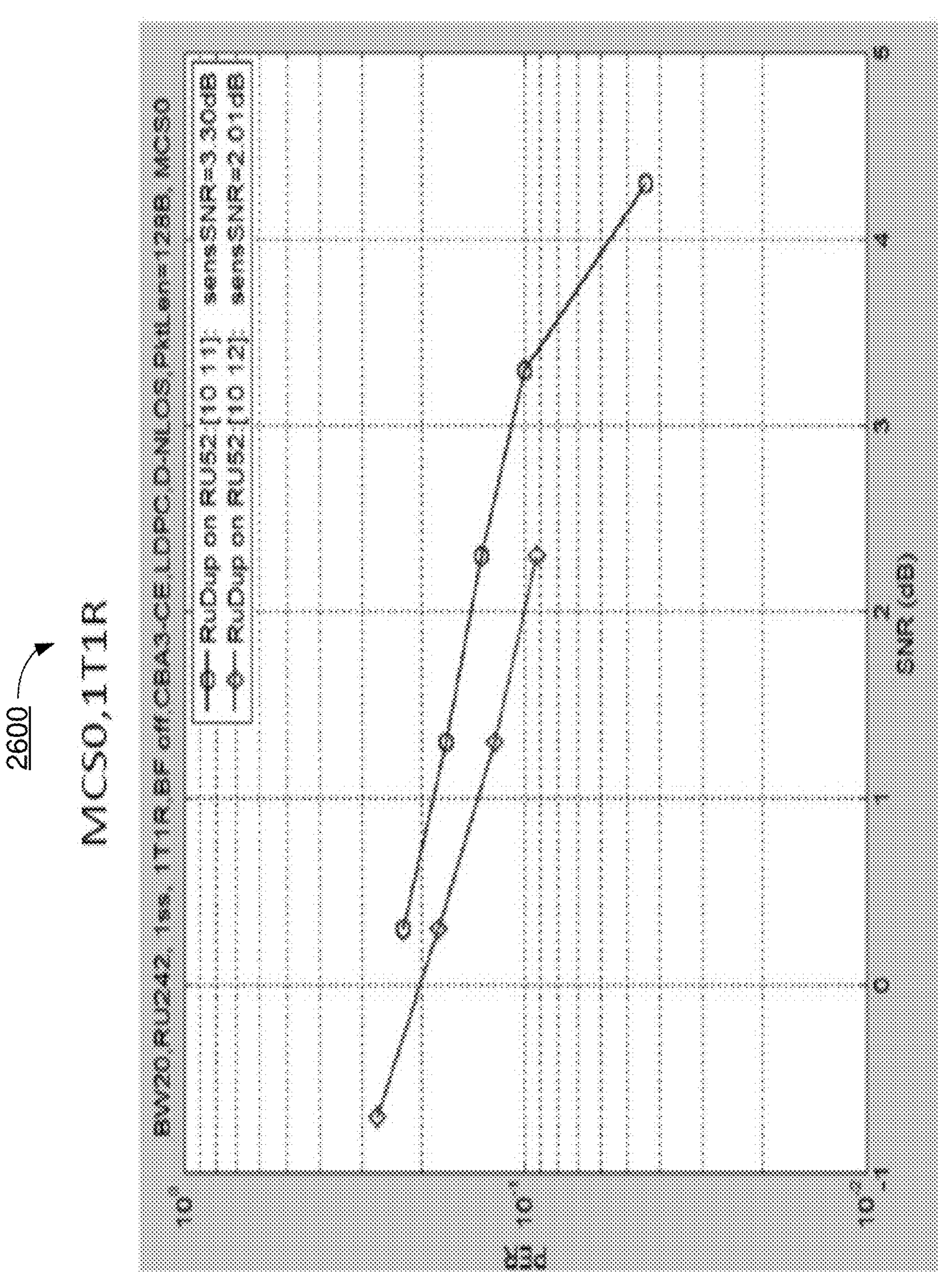
FIG. 26 is a diagram of an example scenario under a proposed scheme in accordance with the present disclosure.

FIG. 26 illustrates an example scenario 2600 under a proposed scheme in accordance with the present disclosure. Scenario 2600 may pertain to PER performance comparisons in simulation with respect to the 2×RU duplication of scenario 2500. The simulation utilized MCSO with respect to a STA (e.g., STA 110 or STA 120) with 1T1R using 1ss in BW20 with RU52 duplication. The curve to the right in the graph represents a simulation result of RU duplication without interleaving. The curve to the left in the graph represents a simulation result of RU duplication with interleaving.

Figure 27:
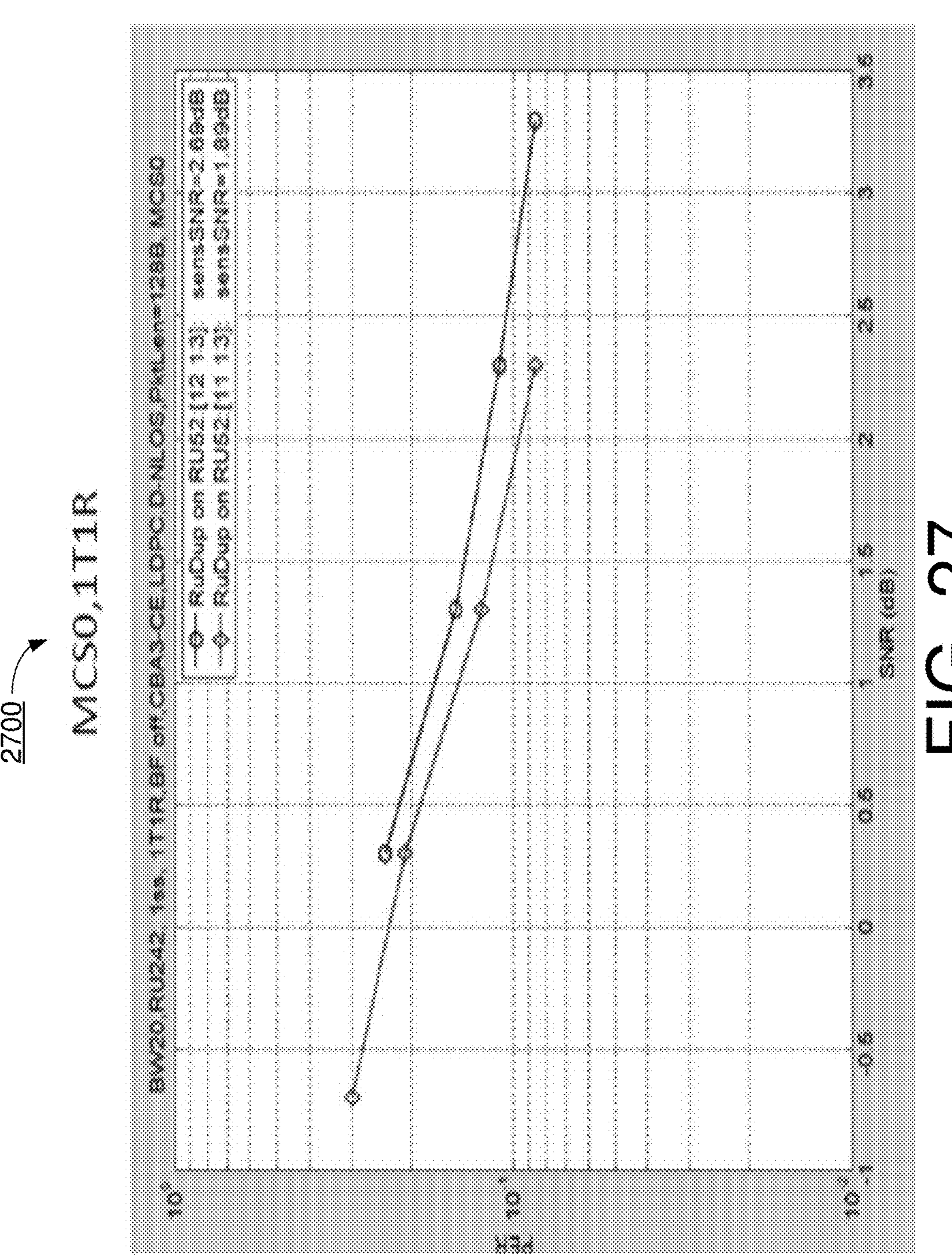
FIG. 27 is a diagram of an example scenario under a proposed scheme in accordance with the present disclosure.

FIG. 27 illustrates an example scenario 2700 under a proposed scheme in accordance with the present disclosure. Scenario 2700 may pertain to PER performance comparisons in simulation with respect to the 2×RU duplication of scenario 2500. The simulation utilized MCSO with respect to a STA (e.g., STA 110 or STA 120) with 1T1R using 1 ss in BW20 with RU52 duplication. The curve to the right in the graph represents a simulation result of RU duplication without interleaving. The curve to the left in the graph represents a simulation result of RU duplication with interleaving.

Figure 28:
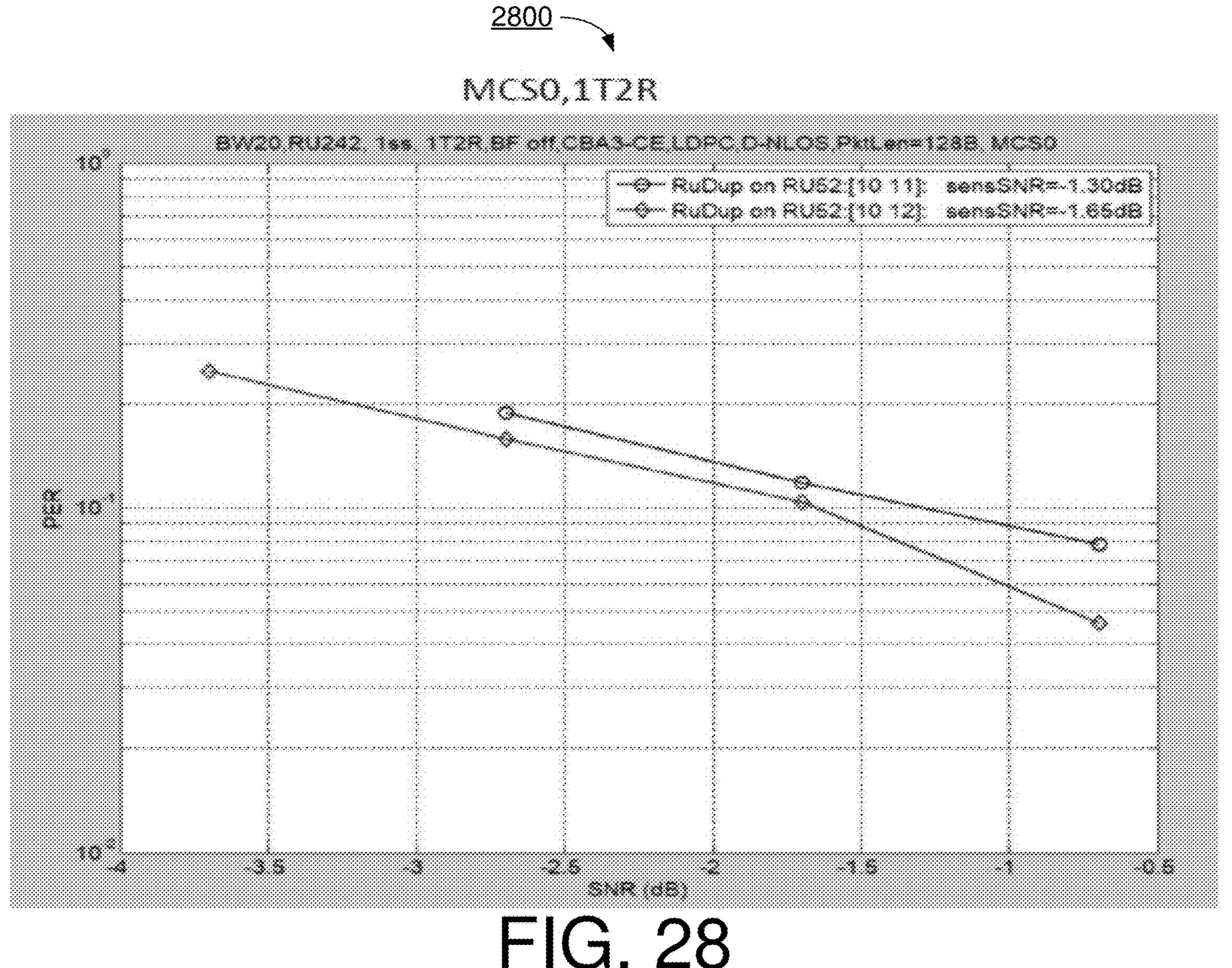
FIG. 28 is a diagram of an example scenario under a proposed scheme in accordance with the present disclosure.

FIG. 28 illustrates an example scenario 2800 under a proposed scheme in accordance with the present disclosure with respect to the 2×RU duplication of scenario 2500. Scenario 2800 may pertain to PER performance comparisons in simulation. The simulation utilized MCSO with respect to a STA (e.g., STA 110 or STA 120) with 1T2R using 1ss in BW20 with RU52 duplication. The curve to the right in the graph represents a simulation result of RU duplication without interleaving. The curve to the left in the graph represents a simulation result of RU duplication with interleaving.

Figure 29:
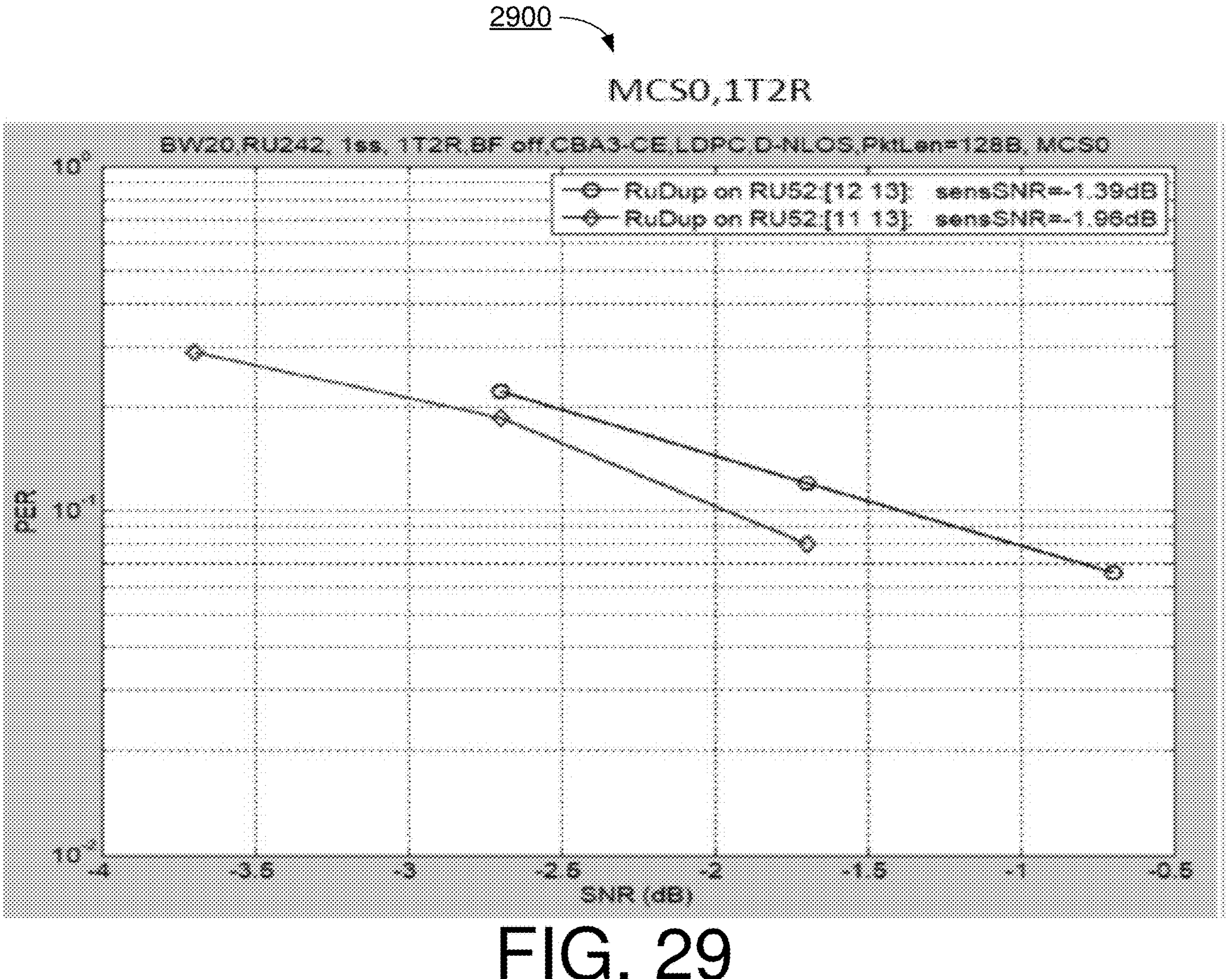
FIG. 29 is a diagram of an example scenario under a proposed scheme in accordance with the present disclosure.

FIG. 29 illustrates an example scenario 2900 under a proposed scheme in accordance with the present disclosure. Scenario 2900 may pertain to PER performance comparisons in simulation with respect to the 2×RU duplication of scenario 2500. The simulation utilized MCSO with respect to a STA (e.g., STA 110 or STA 120) with 1T2R using 1ss in BW20 with RU52 duplication. The curve to the right in the graph represents a simulation result of RU duplication without interleaving. The curve to the left in the graph represents a simulation result of RU duplication with interleaving.

Illustrative Implementations

Figure 30:
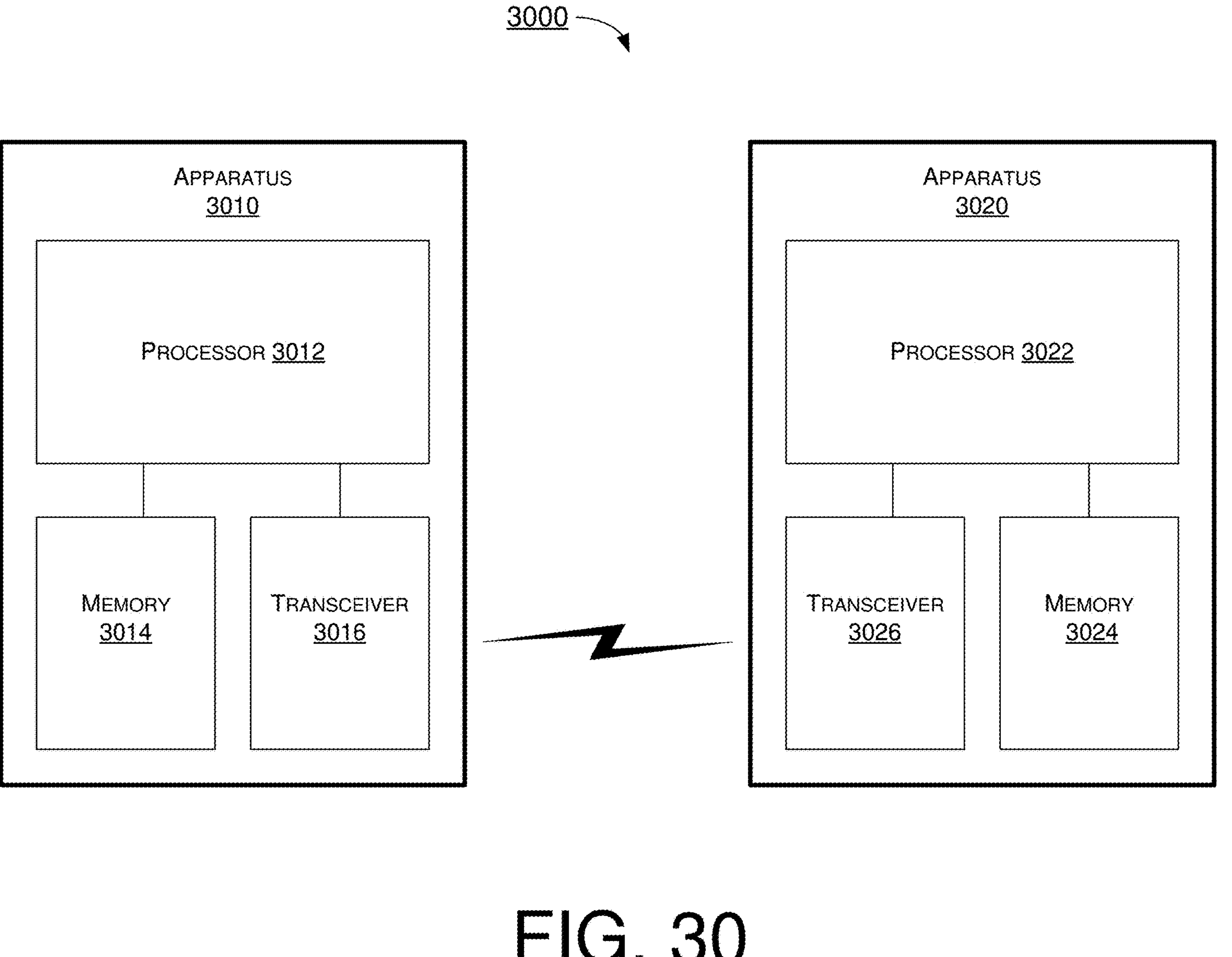
FIG. 30 is a block diagram of an example communication system in accordance with an implementation of the present disclosure.

FIG. 30 illustrates an example system 3000 having at least an example apparatus 3010 and an example apparatus 3020 in accordance with an implementation of the present disclosure. Each of apparatus 3010 and apparatus 3020 may perform various functions to implement schemes, techniques, processes and methods described herein pertaining to performance enhancement of RU duplication with predefined interleaving patterns in wireless communications, including the various schemes described above with respect to various proposed designs, concepts, schemes, systems and methods described above as well as processes described below. For instance, apparatus 3010 may be implemented in STA 110 and apparatus 3020 may be implemented in STA 120, or vice versa.

Each of apparatus 3010 and apparatus 3020 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 3010 and apparatus 3020 may be implemented in a smartphone, a smart watch, a personal digital assistant, a digital camera, or a computing equipment such as a tablet computer, a laptop computer or a notebook computer. Each of apparatus 3010 and apparatus 3020 may also be a part of a machine type apparatus, which may be an IoT apparatus such as an immobile or a stationary apparatus, a home apparatus, a wire communication apparatus or a computing apparatus. For instance, each of apparatus 3010 and apparatus 3020 may be implemented in a smart thermostat, a smart fridge, a smart door lock, a wireless speaker or a home control center. When implemented in or as a network apparatus, apparatus 3010 and/or apparatus 3020 may be implemented in a network node, such as an AP in a WLAN.

In some implementations, each of apparatus 3010 and apparatus 3020 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 3010 and apparatus 3020 may be implemented in or as a STA or an AP. Each of apparatus 3010 and apparatus 3020 may include at least some of those components shown in FIG. 30 such as a processor 3012 and a processor 3022, respectively, for example. Each of apparatus 3010 and apparatus 3020 may further include one or more other components not pertinent to the proposed scheme of the present disclosure (e.g., internal power supply, display device and/or user interface device), and, thus, such component(s) of apparatus 3010 and apparatus 3020 are neither shown in FIG. 30 nor described below in the interest of simplicity and brevity.

In one aspect, each of processor 3012 and processor 3022 may be implemented in the form of one or more single-core processors, one or more multi-core processors, one or more RISC processors or one or more CISC processors. That is, even though a singular term "a processor" is used herein to refer to processor 3012 and processor 3022, each of processor 3012 and processor 3022 may include multiple processors in some implementations and a single processor in other implementations in accordance with the present disclosure. In another aspect, each of processor 3012 and processor 3022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 3012 and processor 3022 is a special-purpose machine specifically designed, arranged and configured to perform specific tasks including those pertaining to performance enhancement of RU duplication with predefined interleaving patterns in wireless communications in accordance with various implementations of the present disclosure.

In some implementations, apparatus 3010 may also include a transceiver 3016 coupled to processor 3012. Transceiver 3016 may include a transmitter capable of wirelessly transmitting and a receiver capable of wirelessly receiving data. In some implementations, apparatus 3020 may also include a transceiver 3026 coupled to processor 3022. Transceiver 3026 may include a transmitter capable of wirelessly transmitting and a receiver capable of wirelessly receiving data. It is noteworthy that, although transceiver 3016 and transceiver 3026 are illustrated as being external to and separate from processor 3012 and processor 3022, respectively, in some implementations, transceiver 3016 may be an integral part of processor 3012 as a system on chip (SoC), and transceiver 3026 may be an integral part of processor 3022 as a SoC.

In some implementations, apparatus 3010 may further include a memory 3014 coupled to processor 3012 and capable of being accessed by processor 3012 and storing data therein. In some implementations, apparatus 3020 may further include a memory 3024 coupled to processor 3022 and capable of being accessed by processor 3022 and storing data therein. Each of memory 3014 and memory 3024 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 3014 and memory 3024 may include a type of read-only memory (ROM) such as mask ROM, programmable ROM (PROM), erasable programmable ROM (EPROM) and/or electrically erasable programmable ROM (EEPROM). Alternatively, or additionally, each of memory 3014 and memory 3024 may include a type of non-volatile random-access memory (NVRAM) such as flash memory, solid-state memory, ferroelectric RAM (FeRAM), magnetoresistive RAM (MRAM) and/or phase-change memory.

Each of apparatus 3010 and apparatus 3020 may be a communication entity capable of communicating with each other using various proposed schemes in accordance with the present disclosure. For illustrative purposes and without limitation, a description of capabilities of apparatus 3010, as STA 110, and apparatus 3020, as STA 120, is provided below in the context of example process 3100. It is noteworthy that, although a detailed description of capabilities, functionalities and/or technical features of apparatus 3020 is provided below, the same may be applied to apparatus 3010 although a detailed description thereof is not provided solely in the interest of brevity. It is also noteworthy that, although the example implementations described below are provided in the context of WLAN, the same may be implemented in other types of networks.

Illustrative Processes

FIG. 31 illustrates an example process 3100 in accordance with an implementation of the present disclosure. Process 3100 may represent an aspect of implementing various proposed designs, concepts, schemes, systems and methods described above. More specifically, process 3100 may represent an aspect of the proposed concepts and schemes pertaining to performance enhancement of RU duplication with predefined interleaving patterns in wireless communications in accordance with the present disclosure. Process 3100 may include one or more operations, actions, or functions as illustrated by one or more of blocks 3110 and 3120. Although illustrated as discrete blocks, various blocks of process 3100 may be divided into additional blocks, combined into fewer blocks, or eliminated, depending on the desired implementation. Moreover, the blocks/sub-blocks of process 3100 may be executed in the order shown in FIG. 31 or, alternatively, in a different order. Furthermore, one or more of the blocks/sub-blocks of process 3100 may be executed repeatedly or iteratively. Process 3100 may be implemented by or in apparatus 3010 and apparatus 3020 as well as any variations thereof. Solely for illustrative purposes and without limiting the scope, process 3100 is described below in the context of apparatus 3010 implemented in or as STA 110 functioning as a non-AP STA and apparatus 3020 implemented in or as STA 120 functioning as an AP STA of a wireless network such as a WLAN in network environment 100 in accordance with one or more of IEEE 802.11 standards. Process 3100 may begin at block 3110.

At 3110, process 3100 may involve processor 3012 of apparatus 3010 generating at least one RU. Process 3100 may proceed from 3110 to 3120.

At 3120, process 3100 may involve processor 3012 performing, via transceiver 3016, a wireless communication (e.g., with apparatus 3020) with RU duplication in a frequency domain using either: (a) a same interleaving pattern applied across OFDM symbols of each duplicated RU of the at least one RU; or (b) two or more interleaving patterns periodically or alternatively switched over OFDM symbols of two or more duplicated RUs of the at least one RU.

In some implementations, the at least one RU may include a plurality of RUs of different sizes. In such cases, in performing the wireless communication with RU duplication, process 3100 may involve processor 3012 duplicating the plurality of RUs of different sizes.

In some implementations, the at least one RU may include a plurality of RUs of a same size. In such cases, in performing the wireless communication with RU duplication, process 3100 may involve processor 3012 duplicating the plurality of RUs different number of times such that a first RU of the plurality of RUs is duplicated N times and a second RU of the plurality of RUs is duplicated M times, with N not equal to M. In other implementations, N may be either equal or not equal to M.

In some implementations, the at least one RU may include a plurality of RUs of different sizes. In such cases, in performing the wireless communication with RU duplication, process 3100 may involve processor 3012 duplicating the plurality of RUs different number of times such that a first RU of the plurality of RUs of a first size is duplicated N times and a second RU of the plurality of RUs of a second size is duplicated M times, with N not equal to M and with the first size not equal to the second size. In other implementations, N may be either equal or not equal to M.

In some implementations, the at least one RU may include a 26-tone RU (RU26). In such cases, in performing the wireless communication with RU duplication, process 3100 may involve processor 3012 duplicating the RU26 three times (3×) for each of one or more users. Alternatively, in performing the wireless communication with RU duplication, process 3100 may involve processor 3012 duplicating the RU26 four times (4×) for each of one or more users.

In some implementations, in performing the wireless communication with RU duplication, process 3100 may involve processor 3012 performing a DL communication of an ELR PPDU with RU duplication using the same interleaving pattern such that a preamble, an ELR-STF and an ELR-LTF of the ELR PPDU are transmitted without any interleaving pattern while transmission of one or more RUs of the at least one RU in an ELR-DATA is performed with RU duplication using the same interleaving pattern.

In some implementations, in performing the wireless communication with RU duplication, process 3100 may involve processor 3012 performing an UL communication of a TB ELR PPDU with RU duplication using the same interleaving pattern such that a preamble of the TB ELR PPDU is transmitted without any interleaving pattern while transmission of one or more RUs of the at least one RU in an ELR-STF, an ELR-LTF and an ELR-DATA is performed with RU duplication using the same interleaving pattern.

In some implementations, in performing the wireless communication with RU duplication, process 3100 may involve processor 3012 performing a DL communication of an ELR PPDU with RU duplication using the two or more interleaving patterns that are periodically or alternatively switched such that a preamble, an ELR-STF and an ELR-LTF of the ELR PPDU are transmitted without any interleaving pattern while transmission of two or more RUs of the at least one RU in an ELR-DATA is performed with RU duplication using the interleaving patterns periodically or alternatively switched in the frequency domain.

In some implementations, in performing the wireless communication with RU duplication, process 3100 may involve processor 3012 duplicating the at least one RU such that duplications of the at least one RU are not adjacent to one another in the frequency domain.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating, by a processor of an apparatus, at least one resource unit (RU); and performing, by the processor, a wireless communication with RU duplication in a frequency domain using either:

a same interleaving pattern applied across orthogonal frequency-division multiplexing (OFDM) symbols of each duplicated RU of the at least one RU; or two or more interleaving patterns periodically or alternatively switched over OFDM symbols of two or more duplicated RUs of the at least one RU, wherein the performing of the wireless communication with the RU duplication comprises performing a first transmission or a second transmission or a third transmission, wherein the first transmission comprises a DL communication of an enhanced long range (ELR) physical-layer protocol data unit (PPDU) with the RU duplication using the same interleaving pattern such that a preamble, an ELR short training field (ELR-STF) and an ELR long training field (ELR-LTF) of the ELR PPDU are transmitted without any interleaving pattern while transmission of one or more RUs of the at least one RU in an ELR data (ELR-DATA) is performed with the RU duplication using the same interleaving pattern, wherein the second transmission comprises an uplink (UL) communication of a trigger-based (TB) ELR PPDU with the RU duplication using the same interleaving pattern such that a preamble of the TB ELR PPDU is transmitted without any interleaving pattern while transmission of one or more RUs of the at least one RU in ELR-STF, an ELR-LTF and an ELR-DATA is performed with the RU duplication using the same interleaving pattern, and wherein the third transmission comprises another DL communication of an ELR PPDU with the RU duplication using the two or more interleaving patterns that are periodically or alternatively switched such that the preamble, the ELR-STF and the ELR-LTF of the ELR PPDU are transmitted without any interleaving pattern while transmission of two or more RUs of the at least one RU in the ELR-DATA is performed with the RU duplication using the interleaving patterns periodically or alternatively switched in the frequency domain.

2. The method of claim 1, wherein the at least one RU comprises a plurality of RUs of different sizes, and wherein the performing of the wireless communication with the RU duplication comprises duplicating the plurality of RUs of different sizes.

3. The method of claim 1, wherein the at least one RU comprises a plurality of RUs of a same size, and wherein the performing of the wireless communication with the RU duplication comprises duplicating the plurality of RUs different number of times such that a first RU of the plurality of RUs is duplicated N times and a second RU of the plurality of RUs is duplicated M times.

4. The method of claim 1, wherein the at least one RU comprises a plurality of RUs of different sizes, and wherein the performing of the wireless communication with the RU duplication comprises duplicating the plurality of RUs different number of times such that a first RU of the plurality of RUs of a first size is duplicated N times and a second RU of the plurality of RUs of a second size is duplicated M times.

5. The method of claim 1, wherein the at least one RU comprises a 26-tone RU (RU26), and wherein the performing of the wireless communication with the RU duplication comprises duplicating the RU26 three times (3×) for each of one or more users.

6. The method of claim 1, wherein the at least one RU comprises a 26-tone RU (RU26), and wherein the performing of the wireless communication with the RU duplication comprises duplicating the RU26 four times (4×) for each of one or more users.

7. The method of claim 1, wherein the performing of the wireless communication with the RU duplication comprises duplicating the at least one RU such that duplications of the at least one RU are not adjacent to one another in the frequency domain.

8. An apparatus, comprising:

a transceiver configured to communicate wirelessly; and a processor coupled to the transceiver and configured to perform operations comprising:

generating at least one resource unit (RU); and performing, via the transceiver, a wireless communication with RU duplication in a frequency domain using either:

a same interleaving pattern applied across orthogonal frequency-division multiplexing (OFDM) symbols of each duplicated RU of the at least one RU; or two or more interleaving patterns periodically or alternatively switched over OFDM symbols of two or more duplicated RUs of the at least one RU, wherein the performing of the wireless communication with the RU duplication comprises performing a first transmission or a second transmission or a third transmission, wherein the first transmission comprises a DL communication of an enhanced long range (ELR) physical-layer protocol data unit (PPDU) with the RU duplication using the same interleaving pattern such that a preamble, an ELR short training field (ELR-STF) and an ELR long training field (ELR-LTF) of the ELR PPDU are transmitted without any interleaving pattern while transmission of one or more RUs of the at least one RU in an ELR data (ELR-DATA) is performed with the RU duplication using the same interleaving pattern, wherein the second transmission comprises an uplink (UL) communication of a trigger-based (TB) ELR PPDU with the RU duplication using the same interleaving pattern such that a preamble of the TB ELR PPDU is transmitted without any interleaving pattern while transmission of one or more RUs of the at least one RU in ELR-STF, an ELR-LTF and an ELR-DATA is performed with the RU duplication using the same interleaving pattern, and wherein the third transmission comprises another DL communication of an ELR PPDU with the RU duplication using the two or more interleaving patterns that are periodically or alternatively switched such that the preamble, the ELR-STF and the ELR-LTF of the ELR PPDU are transmitted without any interleaving pattern while transmission of two or more RUs of the at least one RU in the ELR-DATA is performed with the RU duplication using the interleaving patterns periodically or alternatively switched in the frequency domain.

9. The apparatus of claim 8, wherein the at least one RU comprises a plurality of RUs of different sizes, and wherein the performing of the wireless communication with the RU duplication comprises duplicating the plurality of RUs of different sizes.

10. The apparatus of claim 8, wherein the at least one RU comprises a plurality of RUs of a same size, and wherein the performing of the wireless communication with the RU duplication comprises duplicating the plurality of RUs different number of times such that a first RU of the plurality of RUs is duplicated N times and a second RU of the plurality of RUs is duplicated M times.

11. The apparatus of claim 8, wherein the at least one RU comprises a plurality of RUs of different sizes, and wherein the performing of the wireless communication with the RU duplication comprises duplicating the plurality of RUs different number of times such that a first RU of the plurality of RUs of a first size is duplicated N times and a second RU of the plurality of RUs of a second size is duplicated M times.

12. The apparatus of claim 8, wherein the at least one RU comprises a 26-tone RU (RU26), and wherein the performing of the wireless communication with the RU duplication comprises duplicating the RU26 three times (3×) for each of one or more users.

13. The apparatus of claim 8, wherein the at least one RU comprises a 26-tone RU (RU26), and wherein the performing of the wireless communication with the RU duplication comprises duplicating the RU26 four times (4×) for each of one or more users.

14. The apparatus of claim 8, wherein the performing of the wireless communication with the RU duplication comprises duplicating the at least one RU such that duplications of the at least one RU are not adjacent to one another in the frequency domain.

* * * * *